US012609003B2

(12) United States Patent
Hirsch

(10) Patent No.: US 12,609,003 B2
(45) Date of Patent: Apr. 21, 2026

(54) SYSTEM FOR COMMUNITY PLAY OF CARD, POKER, LOTTERY, AND SLOT GAMES

(71) Applicant: David Brian Hirsch, Indianapolis, IN (US)

(72) Inventor: David Brian Hirsch, Indianapolis, IN (US)

( * ) Notice: Subject to any disclaimer, the term of this patent is extended or adjusted under 35 U.S.C. 154(b) by 180 days.

(21) Appl. No.: 18/239,425

(22) Filed: Aug. 29, 2023

(65) Prior Publication Data

US 2024/0071181 A1 Feb. 29, 2024

Related U.S. Application Data

(60) Provisional application No. 63/402,331, filed on Aug. 30, 2022.

(51) Int. Cl.
*G07F 17/32* (2006.01)

(52) U.S. Cl.
CPC ...... *G07F 17/3293* (2013.01); *G07F 17/3213* (2013.01); *G07F 17/3244* (2013.01); *G07F 17/3272* (2013.01)

(58) Field of Classification Search
CPC ............. G07F 17/3293; G07F 17/3213; G07F 17/3244; G07F 17/3272
USPC ............................................................ 463/42
See application file for complete search history.

(56) References Cited

U.S. PATENT DOCUMENTS

| | | | | |
|---|---|---|---|---|
| 11,842,603 | B2 * | 12/2023 | Cohn | G07F 17/34 |
| 12,277,840 | B2 * | 4/2025 | Bouvier | G07F 17/3211 |
| 2011/0039610 | A1 * | 2/2011 | Baerlocher | G07F 17/3244 463/43 |
| 2022/0277613 | A1 * | 9/2022 | Milosevich | G07F 17/3213 |
| 2023/0098777 | A1 * | 3/2023 | Cohn | G07F 17/34 463/20 |
| 2023/0154287 | A1 * | 5/2023 | Bouvier | G07F 17/3211 463/20 |
| 2023/0343168 | A1 * | 10/2023 | Milosevich | G07F 17/3267 |
| 2025/0087056 | A1 * | 3/2025 | Nauman | G07F 17/34 |
| 2025/0118162 | A1 * | 4/2025 | Tucker | G07F 17/3267 |

* cited by examiner

*Primary Examiner* — Pierre E Elisca
(74) *Attorney, Agent, or Firm* — James E. Larson

(57) ABSTRACT

A gaming system includes a server and multiple player devices each associated with a player. A set of symbols includes non-termination symbols and termination symbols. The server receives wagers based on predefined conditions, such as the number or specific combination of non-termination symbols drawn before a termination symbol appears. The server sequentially draws and displays symbols to active players, determining outcomes according to the wager type. For wagers based on the number of symbols drawn before a termination symbol appears, players may elect to cash out before each subsequent draw until the predefined number is reached. When a termination symbol is drawn, the server determines winners and losers based on the active wager type and credits player accounts accordingly. In one embodiment, the symbols correspond to a deck of playing cards with added Joker cards serving as termination symbols.

12 Claims, 20 Drawing Sheets

200

206

Pass Line Pays

| | | | | | | | |
|---|---|---|---|---|---|---|---|
| 1 | Even | 14 | 3.2x | 27 | 15.0x | 40 | 190x |
| 2 | 1.1x | 15 | 3.5x | 28 | 17.0x | 41 | 260x |
| 3 | 1.2x | 16 | 3.9x | 29 | 20.0x | 42 | 350x |
| 4 | 1.3x | 17 | 4.3x | 30 | 24.0x | 43 | 500x |
| 5 | 1.4x | 18 | 4.8x | 31 | 28.0x | 44 | 720x |
| 6 | 1.5x | 19 | 5.4x | 32 | 33.0x | 45 | 1000x |
| 7 | 1.6x | 20 | 6.1x | 33 | 40.0x | 46 | 1700x |
| 8 | 1.8x | 21 | 6.8x | 34 | 49.0x | 47 | 2800x |
| 9 | 2.0x | 22 | 7.7x | 35 | 60.0x | 48 | 5100x |
| 10 | 2.2x | 23 | 8.7x | 36 | 74.0x | 49 | 10000x |
| 11 | 2.4x | 24 | 10.0x | 37 | 92.0x | 50 | 23000x |
| 12 | 2.6x | 25 | 11.0x | 38 | 110.0x | 51 | 71000x |
| 13 | 2.9x | 26 | 13.0x | 39 | 150.0x | 52 | 350000x |

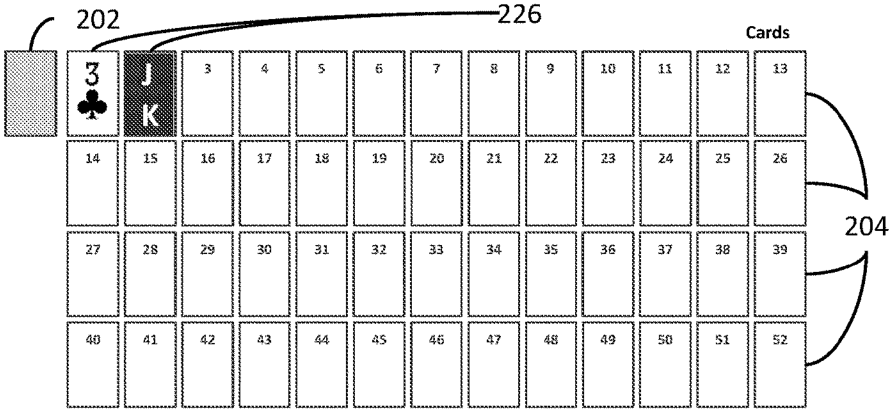

214

Joker!

208

Don't Pass Line Pays

| | |
|---|---|
| On Card 1 | 13 to 1 |
| By Card 2 | 7 to 1 |
| By Card 3 | 9 to 2 |
| By Card 4 | 7 to 2 |
| By Card 5 | 3 to 1 |
| By Card 6 | 5 to 2 |
| By Card 8 | 2 to 1 |
| By Card 12 | 3 to 2 |
| By Card 18 | 5 to 4 |

Combo Line Pays

210

| | |
|---|---|
| Jacks or Better | 2 to 1 |
| 2 Pairs | 3 to 1 |
| 3 of a Kind | 5 to 1 |
| Straight | 8 to 1 |
| Flush | 12 to 1 |
| Full House | 20 to 1 |
| 4 of a Kind | 100 to 1 |
| Straight Flush | 500 to 1 |
| Royal Flush | 750 to 1 |

Next Game Starts In
10.0 Seconds

212

Player Table: Joker Line

| Username | Bet Type | Action | Bet Amt | P/L |
|---|---|---|---|---|
| User A | Joker: by Card 2 | Win 7.0x | $10.00 | $60.00 |
| User B | Joker: by Card 8 | Win 2.0X | $50.00 | $50.00 |
| User C | Joker: by Card 1 | Lose | $100.00 | - $100.00 |

224

Player A Bets Placed:

1. Joker Line $10.00: Joker by Card 2 (7.0x): Win $70.00!

*FIG. 18*

SYSTEM FOR COMMUNITY PLAY OF CARD, POKER, LOTTERY, AND SLOT GAMES

CROSS-REFERENCE TO RELATED APPLICATION

This application claims the benefit of U.S. provisional application No. 63/402,331 filed on Aug. 30, 2022, the disclosure of which is incorporated by reference.

FIELD

This invention relates to the field of entertainment and more particularly to a series of gaming systems that enable multiple people to play a variety of single-player games in tandem, including, but not limited to, card-based games, lottery-style games, dice games and slot-style games, in a community environment, either at a physical playing table or apparatus, or remotely (online or through a connected device), where players enjoy the same foundational gaming experience with each other and have the ability to view the activity of other players (predictions, bets, playing decisions, results, etc.) in real time.

BACKGROUND

The casino gaming industry is extremely competitive. Two of the biggest challenges that both online and land-based casino operators face are attracting new players and keeping existing players properly engaged. There are many ways that operators address these challenges. This includes the offering of player incentives such as free play or deposit bonuses and providing new and engaging game formats that offer attractive prizing or payouts and exciting or engaging game play. One way that operators can increase player engagement is by fostering a community environment. This is because people, in general, prefer to play games with other people. This is even true of single-player games that are designed so that they can be played in isolation.

One feature that is important in a community environment is to provide players with a shared gaming experience. One way this is achieved is by having the foundation of the game (and the results thereof) be based on a set of objective criteria simultaneously observable to all participants. Obviously, this is much easier in a land-based environment than online. In a physical setting, a shared experience is inherent to some games that are traditionally single-player games. For example, in the game of Roulette, when played at a physical location, players are playing against the house individually, but all players are subject to the outcome of the same spinning wheel. The same is true with Blackjack, where players are all playing individually against the dealer, as well as with Craps, where all players are playing against the house, but subject to the outcome of the roll of a single set of dice rolled by one of the players. Being in physical proximity also allows players to observe the play of other players and even enables players to engage in conversation. Smart land-based casino operators know that gaming tables that are empty tend to stay empty and tables that are occupied attract more players in the community. This is due to the old adage "nothing attracts a crowd like a crowd." In the online world, incorporating a shared gaming experience for single-player games is much more difficult. This is especially true for the games commonly found in land-based casinos as mentioned directly above.

Recently, a new category of online game has emerged that enables multiple people to play single-player games in tandem with other players in a community environment where players enjoy a shared foundational experience, have the ability to view the activity of other players (predictions, bets, playing decisions, results, etc.) and, in some cases, even communicate with other players in real time. These "Community Games" or "CG's" are different than traditional multiplayer games like Texas Hold'em in that the players do not compete against each other, but rather with each other against the game operator or "house." CG's have many benefits over multiplayer games. One major benefit is the need for player liquidity; that is the need for a critical mass of players to be playing to make a game viable, i.e., enticing for many people to play at once. CG's are inherently single-player games. As such, they do not require player liquidity. Although the playing experience is enhanced through the introduction of community elements, CG's can still be played by a single, lone player playing by themselves. In contrast, multiplayer games must have a minimum number of players before play can be initiated. This could be two players on the low end for a head-to-head match-up and could range to a critical mass of several thousand or even tens of thousands for certain online massive-multiplayer formats. Recently, a small set of game developers have been successful in creating CG's for a limited number of underlying game formats. One such example is a game commonly referred to as "Crash" (but also called "Aviator" and "Rocket" by certain operators). In Crash, players are "passengers" on a graphically rendered rocket ship. The objective is to bail out of the rocket ship after takeoff, but before it explodes. The trajectory of the rocket is parabolic and the higher it climbs before you bail out, the higher the payout. The "altitude" of the rocket is measured in return multiples (i.e., 2.0×, 3.0×, 4.0× and so on). The higher the altitude, the higher the return, but also the higher risk of explosion. Prior to takeoff, players are given a limited amount of time to place their bets. Bets can be manual or structured with a so called "auto cash out," wherein once the parabolic trajectory reaches a certain altitude or after a certain amount time after "lift of," the player bails out. With a manual bet, the player sets the amount they wish to bet, i.e., when they wish to bail out. The rocket takes off and the player must then manually hit the cash out button to eject from the rocket ship before it crashes and cashes out of the bet. With auto cash out bets, the player sets the wager amount and then a multiple amount that automatically triggers the cash out. For example, if the bet is set to $1.00 and the trigger cash out multiple is set to 3.0× and the rocket hits an altitude of 3.0× before exploding, the player's bet is automatically cashed out and the player is awarded their bet multiplied times three, or the cash out multiple. It is important to note that in Crash, the players are not playing against each other, but instead the house. Crash, at its core, is a single-player game and can be played in isolation. However, the game incorporates three important features that foster community engagement and cooperation.

First, everyone is betting on the same graphically rendered rocket, which is prominently displayed in the user interface of each player. The rocket launches, then soars (with the altitude multiplier being reported in real time) and then explodes at the same time for each player of the community. Also, additional information related to past game play, such as the final altitude of the last five rockets, is displayed and updated in real time. This creates a shared foundational experience.

Second, a player board is displayed that reveals player usernames, the cash amount (if triggered), the amount of the bet and the profit (or loss) of the player's bet. This player board is updated in real time, so the players can see how the other players played the game and how they performed. By showing how other players are playing (and performing in) the game, the shared experience is enhanced.

Lastly, a chat window is accessible by the players so they can communicate in masse and comment on game play.

Crash is also a high-volatility game that incorporates a potentially massive payout. The algorithm that randomly determines the final altitude of the rocket (before it explodes) has been cleverly designed to occasionally produce a final altitude (multiplier) that can be in the hundreds or even thousands. Additionally, its game mechanics are very simple, which makes it appealing to a wide audience.

Although Crash has been exceptionally successful, it has some potential problems. First, the underlying foundational experience (the rocket trajectory) is essentially the same every time. The final altitude before explosion varies greatly, but for many prospective players, play becomes tedious or even mundane at some point. Additionally, it is not a game that can be played offline on a physical gaming table in a land-based casino. So, improvements are clearly needed.

In particular, new CG's that incorporate simple game mechanics, a shared foundational gaming experience, greater variety in foundational experience, all of which can be played in both an online environment and a land-based environment through a physical gaming apparatus, a physical table or gaming station are needed.

SUMMARY

People are more likely to play and enjoy single-player games that enable multiple people to play in tandem in a community environment where players enjoy a shared foundational experience and have the ability to observe the activity of other players (predictions, bets, playing decisions, results, etc.) in real time (hereafter referred to as "Community Games" or "CG's"). People are also more likely to play CG's that are higher in volatility and offer the chance to win large prizes, even when the odds of winning a large prize are long. Lastly, people are also more likely to play and enjoy CG's that can be played online and offline in a land-based environment on a physical playing table or gaming apparatus.

In a first embodiment, a gaming system includes a physical playing table, a live dealer, a defined a set of symbols displayed through a physical medium (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). Included also is a cash out schedule that defines a cash out multiple based on the total cumulative number of symbols drawn or produced from the defined set of symbols before a termination symbol is drawn. The dealer first requests that a wager be placed on the playing table concurrently from each player. Once all players have placed their wagers on the playing table, the dealer randomly selects and reveals a first symbol from the defined set of symbols. If the first symbol is a termination symbol, the dealer terminates the round of play for all of the players and the players lose their wagers. If the first symbol is not a termination symbol, the dealer sequentially gives each player the option to cash out of their bet in an amount equal to the player's wager multiplied by the relevant multiple on the cash out schedule associated with the cumulative total number of symbols drawn or produced before a termination symbol. If a player elects to cash out, the dealer then pays the player an amount equal to the player's wager times the relevant multiple on the cash out schedule and the round ends for that player. After all players have been afforded the option to cash out, the process starts over, and the dealer randomly draws and reveals a second symbol from the defined set of symbols. If the second symbol is a termination symbol, the dealer terminates the round of play for all of the remaining players and the remaining players lose their wagers. If the second symbol is not a termination symbol, the dealer sequentially gives each remaining player the option to cash out their bet in an amount equal to the player's wager multiplied by the relevant multiple on the cash out schedule associated with the cumulative total number of symbols drawn before a termination symbol. If a player elects to cash out, the dealer then pays the player an amount equal to the player's wager times the relevant multiple on the cash out schedule and the round ends for that player. This process then repeats until all remaining players have cashed out, a termination symbol appears, a pre-established cumulative total of drawn symbols has been reached or all non-termination symbols in the defined set of symbols have been revealed and removed from the set of symbols.

In a second embodiment, a gaming system includes a physical playing table, a live dealer, a defined a set of symbols displayed on a physical medium (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). Included also is a pay table that defines a payout multiple based on the total cumulative number of symbols drawn from the defined set of symbols by when a termination symbol is first drawn (e.g., the termination symbol will be drawn on the first symbol or the termination symbol will be drawn by the fifth symbol and so on). The dealer requests that a wager be placed on the playing table concurrently from each player where the wager options are based on the total cumulative number of symbols drawn by when a termination symbol is first drawn. Once all players have placed their wagers on the playing table, the dealer randomly selects and reveals a first symbol from the defined set of symbols. If the first symbol is a termination symbol, the dealer then pays each player an amount equal to that player's wager times the relevant multiple from the payout out schedule and the round ends for all players. If the first community symbol is not a termination symbol, and the player's wager was based on the termination symbol being drawn by the first draw, the dealer terminates the round of play for that player and that player loses his wager. The process starts over, and the dealer randomly selects and reveals a second symbol from the defined set of symbols. If the second symbol is a termination symbol, the dealer then pays each remaining player an amount equal to that player's wager times the relevant multiple of the payout schedule and the round ends for all remaining players. If the second symbol is not a termination symbol, and the player's wager was based on the termination symbol being drawn by the second symbol, then the dealer terminates the round of play for that player and that player loses his wager. The process then repeats until all players have lost their wagers, the termination symbol appears, a pre-established cumulative total of drawn symbols has been reached or all non-termination symbols in the defined set of symbols have been revealed and removed from the set of symbols.

In a third embodiment, a gaming system includes a physical playing table, a live dealer, a defined a set of symbols displayed on a physical medium (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). Included also is a pay table that defines a payout multiple based on the drawing of a single symbol or specific combination of symbols before a termination symbol is first drawn (e.g., a Jack or lotto ball numbered 5, or a poker hand that is a straight or a sequential series of five numbered lottery balls in order, etc.). The dealer requests that a wager be placed on the playing table concurrently from each player where the wager options are based on the drawing of a single symbol or specific combination of symbols before a termination symbol is drawn. Once all players have placed their wagers on the playing table, the dealer randomly selects and reveals a first symbol from the defined set of symbols. If the first symbol is a termination symbol, the dealer terminates the round of play for all of the players and who all lose their wager. If the first symbol is not a termination symbol and the specific winning single symbol predicted by a given player is found in the first symbol, the dealer pays that player an amount equal to that player's wager times the relevant multiple of payout out schedule and the round ends for that player. The process starts over, and the dealer randomly selects and reveals a second symbol from the defined set of symbols. If the second symbol is a termination symbol, the dealer terminates the round of play for all of the remaining players, and they all lose their wagers. If the second symbol is not a termination symbol and the specific single symbol or specific combination of symbols predicted by a given player is found in the combined symbols from the first and second draws, the dealer pays that player an amount equal to that player's wager times the relevant multiple of the payout out schedule and the round ends for that player. The process then repeats until all players have won their wagers, the termination symbol appears, a pre-established cumulative total of drawn symbols has been reached or all non-termination symbols in the defined set of symbols have been revealed and removed from the set of symbols.

In a fourth embodiment, a gaming system includes a server and a plurality of player client devices, each associated with a player. There is a defined a set of symbols (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). There is a cash out schedule displayed on the client devices that defines a cash out multiple based on the cumulative total number of symbols drawn from the defined set of symbols before a termination symbol is drawn. There is also a table displayed on the player client devices that provides the information of all players playing or a sub-set of players playing therein that includes relevant player information including, but not limited to, a player's username, wager amount and profit or loss ("p/I") amount for the given wager (the "Player Table"). The server requests a wager concurrently from each client device and starts a pre-programmed initial time period. After this initial time period ends, for the each player client device that made the wager within said initial time period, the server collects the wager and debits the account of the player. The server updates the Player Table by including the usernames of the players playing and their respective wager amount. The server, using a random number generator, then randomly draws the first symbol from the set of symbols. The server then displays the first symbol and the timer on a display of each client device. If the first symbol is a termination symbol, the server terminates the round of play for all of the players, they all lose their wagers, and the server updates the Player Table to reflect the loss of each player. If the first symbol is not a termination symbol, the server calculates an individual cash out offer for each player based on that player's wager multiplied by the relevant multiple on the cash out schedule and then displays that player's first cash out offer and cash out decision time period on a display of the player's client device. After the cash out decision time period ends, for the each player client device that accepted the first cash out offer within the cash out decision time period, the server credits that player's account with the amount of the cash out offer, ends that player's round of play and updates the Player Table to reflect that player's p/I for the wager. After the cash out decision time period, for the each player client device that did not accept the cash out offer within the cash out decision time period, the cash out offer is withdrawn. The server then randomly draws the second symbol from the remaining set of symbols. The server then displays the second symbol on a display of each client device. If the second symbol is a termination symbol, the server terminates the round of play and all of the players that were still playing lose their wager and the server updates the Player Table to reflect the loss of each player. If the second symbol is not a termination symbol, the server calculates a cash out offer for each player based on that player's wager multiplied by the relevant multiple on the pass line payout table and starts a cash out decision time period and then displays that player's cash out offer and second time period on a display of the player's client device. After the cash out decision time period ends, for the each player client device that accepted the cash out offer within the cash out decision time period, the server credits that player's account with the amount of the second cash out offer and ends that player's round of play and the server updates the Player Table to reflect that player's p/I for the wager. After the cash out decision time period, for the each player client device that did not accept the cash out offer within the cash out decision time period, the cash out offer is withdrawn. The process then repeats until all remaining players have cashed out, a termination symbol appears, a pre-established cumulative total of drawn symbols has been reached or all non-termination symbols in the defined set of symbols have been revealed and removed from the set of symbols.

In a fifth embodiment, a gaming system includes a gaming system includes a server and a plurality of player client devices, each associated with a player. There is a defined a set of symbols (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). There is a pay table displayed on the player client device that defines a payout multiple based on the total cumulative number of symbols drawn from the defined set of symbols by when a termination symbol is first drawn (e.g., a termination symbol will be drawn on the first symbol or a termination symbol will be drawn by the fifth symbol and so on). There is also a table displayed on the player client devices that provides the information of all players playing or a sub-set of players playing therein that includes relevant player information including, but not limited to, a player's username, wager amount and profit or loss ("p/I") amount for the given wager (the "Player Table"). The server requests a wager concurrently from each client device and starts an initial time period. After the initial time period ends, for the each player client device that made the wager within the initial time period, the server collects the wager and debits the account of the player. The server updates the Player Table by including the usernames of the players playing and their respective wager amount. The server, utilizing a random number generator, then draws the first symbol from the set of symbols. The server then displays the first symbol on a display of the each client device. If the first symbol is a termination symbol, the server pays each player an amount equal to that player's wager times the relevant multiple on the payout out schedule and the round ends for all players. If the first symbol is not a termination symbol, and the player's wager was based on the termination symbol being drawn in the first draw, the server terminates the round of play for that player and that player loses his wager. The process starts over, and the server randomly selects a second symbol from the defined set of symbols. The server then displays the second symbol on a display of each client device. If the second symbol is a termination symbol, the server then pays each remaining player an amount equal to that player's wager times the relevant multiple on the payout out schedule and the round ends for all remaining players. If the second symbol is not a termination symbol, and the player's wager was based on the termination symbol being drawn by the second symbol, the server terminates the round of play for that player and that player loses his wager and the server updates the Player Table to reflect that player's p/I for the wager. The process then repeats until all players have lost their wagers, the termination symbol appears, a pre-established cumulative total of drawn symbols has been reached or all non-termination symbols in the defined set of symbols have been revealed and removed from the set of symbols.

In a sixth embodiment, a gaming system includes a server and a plurality of player client devices, each associated with a player. There is a defined a set of symbols (e.g., playing cards, numbered lottery balls, dice, sections of a roulette wheel, slot machine reels, etc.). Included in the defined set of symbols is a sub-set of termination symbols (e.g., Joker cards, lottery balls, section of a roulette wheel or slot reel labeled with a double 00, a dice face with the letter X, etc.). Included also is a pay table displayed on the player client devices that defines a payout multiple based on the drawing of a single symbol or specific combination of symbols before a termination symbol is first drawn (e.g., a Jack or lotto ball numbered 5 or a straight or sequential series of numbered lottery balls, etc.). There is also a table displayed on the player client devices that provides the information of all players playing or a sub-set of players playing therein that includes relevant player information including, but not limited to, a player's username, wager amount and profit or loss ("p/I") amount for the given wager (the "Player Table"). The server requests a wager concurrently from each client device and starts an initial time period. After the initial time period ends, for the each player client device that made the wager within the initial time period, the server collects the wager and debits the account of the player. The server updates the Player Table by including the usernames of the players playing and their respective wager amount. The server, utilizing a random number generator, then draws the first symbol from the set of symbols. The server then displays the first symbol on a display of each client device. If the first symbol is a termination symbol, the server terminates the round of play for all of the players, all players lose their wagers, and the server updates the Player Table to reflect the loss of each player. If the first symbol is not a termination symbol and the specific single symbol or specific combination of symbols predicted by a given player is the first symbol, the server declares that player a winner and pays them an amount equal to that player's wager times the relevant multiple in the payout out schedule, the round ends for that player and the server updates the Player Table to reflect the profit of the winning player. The process starts over, and the server randomly selects a second symbol from the defined set of symbols. The server then displays the second symbol on a display of the each client device. If the second symbol is a termination symbol, the server terminates the round of play for all of the remaining players and these remaining players lose their wagers. If the second symbol is not a termination symbol and the specific single symbol or specific combination of symbols predicted by a given player are found in the combined symbols from the first and second draws, the server declares that player a winner and pays them an amount equal to that player's wager times the relevant multiple of the wager based on the payout out schedule and the round ends for that player and the server updates the Player Table to reflect that player's p/I for the wager. The process then repeats until all players have won their wagers, the termination symbol appears, a pre-established cumulative total of drawn symbols has been reached or all non-termination symbols in the defined set of symbols have been revealed and removed from the set of symbols.

BRIEF DESCRIPTION OF THE DRAWINGS

The invention can be best understood by those having ordinary skill in the art by reference to the following detailed description when considered in conjunction with the accompanying drawings in which:

FIG. 18 illustrates the user-interface of the present invention after the first three community cards have been drawn and the second card is revealed to be a Joker card, and as such the user wins his.

DETAILED DESCRIPTION

Figure 1:
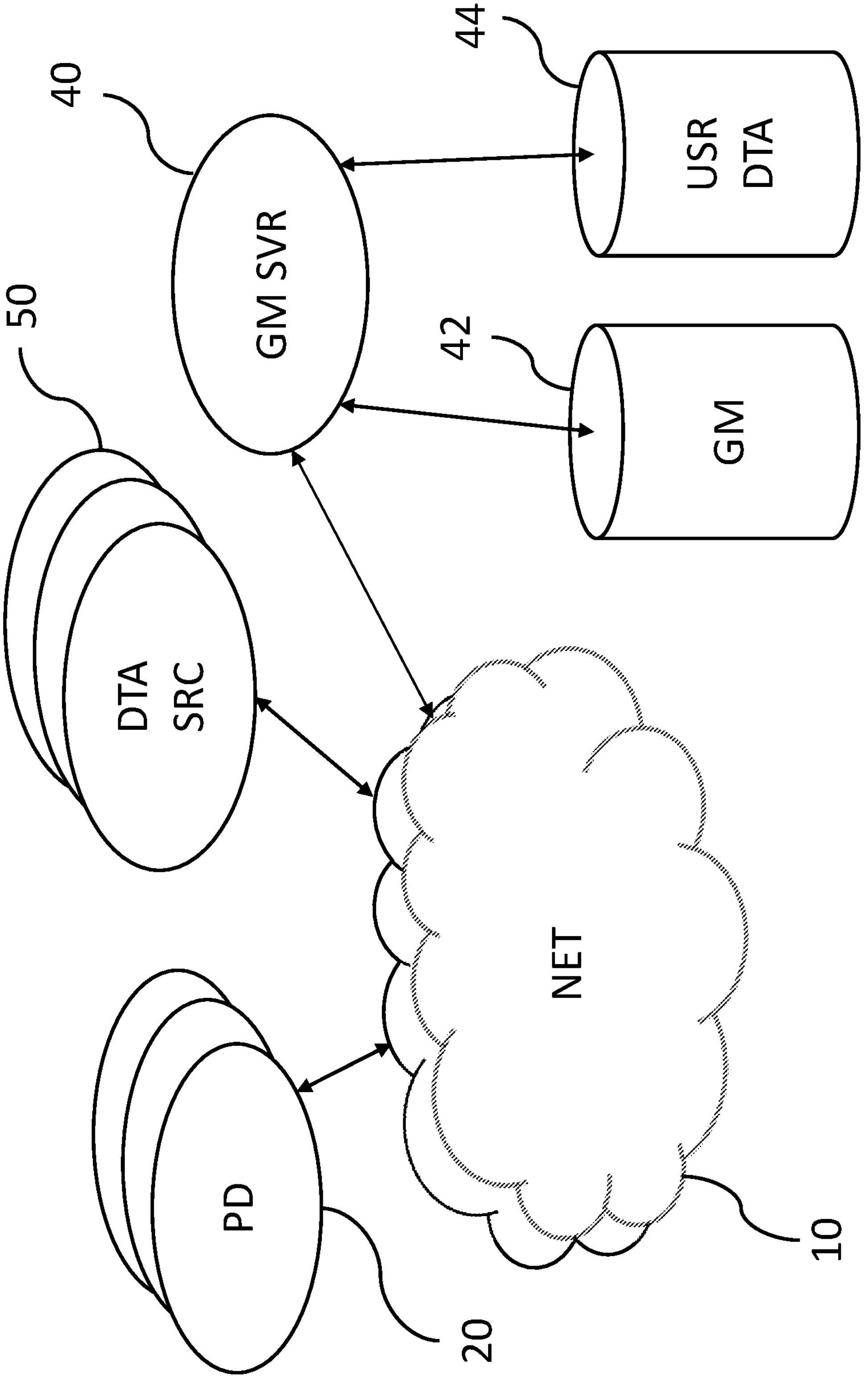
FIG. 1 illustrates a schematic view of a gaming system.

Reference will now be made in detail to the presently preferred embodiments of the invention, examples of which are illustrated in the accompanying drawings. Throughout the following detailed description, the same reference numerals refer to the same elements in all figures.

Throughout this description, examples relating to the embodiments described above are provided where the material representation of the game symbols, either physically or graphically, is in the form of a standard deck of 52 standard playing cards with four Joker cards included as the termination card and where the relevant combinations of symbols pertain to achievement of certain standard poker hands. However, it is also contemplated that the material representation of the symbols, either physically or graphically, will be in other forms and shall include, but not be limited to, cards other than standard playing cards, lottery balls, dice or a single die, sections of a roulette wheel or spinning wheel, slot machine reels and other material forms of representation.

It is further contemplated that in future iterations and/or embodiments of the inventions described herein, the set of symbols will include, in addition to non-termination and termination symbols, symbols that trigger a bonus payout or multiplier (e.g., a double bonus, etc.), one or more free plays of the underlying game, one or more free plays of a bonus game (e.g., free spins of a prize wheel) and universal symbols ("wild cards" or "wild symbols") that can become or be used as one or more other symbols included in the set of symbols to create certain combinations.

It is further contemplated that the gaming systems described include the incorporation of a live dealer who is in a remote location and being broadcasted or live streamed in conjunction with the systems described in FIG. 12 through FIG. 19.

It is further contemplated that the gaming systems and/or underlying game formats described and contemplated herein be delivered through a physical gaming apparatus, including, but not limited to a video gaming terminal or video lottery terminal, regardless as to whether those apparatuses are connected together or through a central system, including, but not limited to, an intranet or the Internet.

Referring to FIG. 1, a schematic view of a gaming system is shown. Multiple participant devices 20 (computers, smart phones, etc.) connect to the game server 40 through a network 10, for example, through the Internet.

Game details and settings are stored in a game storage area 42, such as, the list of games to be simulated, the list of players for selection by the participants, the starting date and time, the ending date and time, and the number of players that each participant must select.

The data sources 50 includes any reputable source of outcomes such as newspapers (e.g., USA Today), sport-based services, financial services, racetrack web sites, etc. In some embodiments, the data is directly downloaded from the data sources 50, through a network 10 (e.g., the Internet), while in other embodiments, the data is manually entered into the game server 40 through a user interface.

Figure 2:
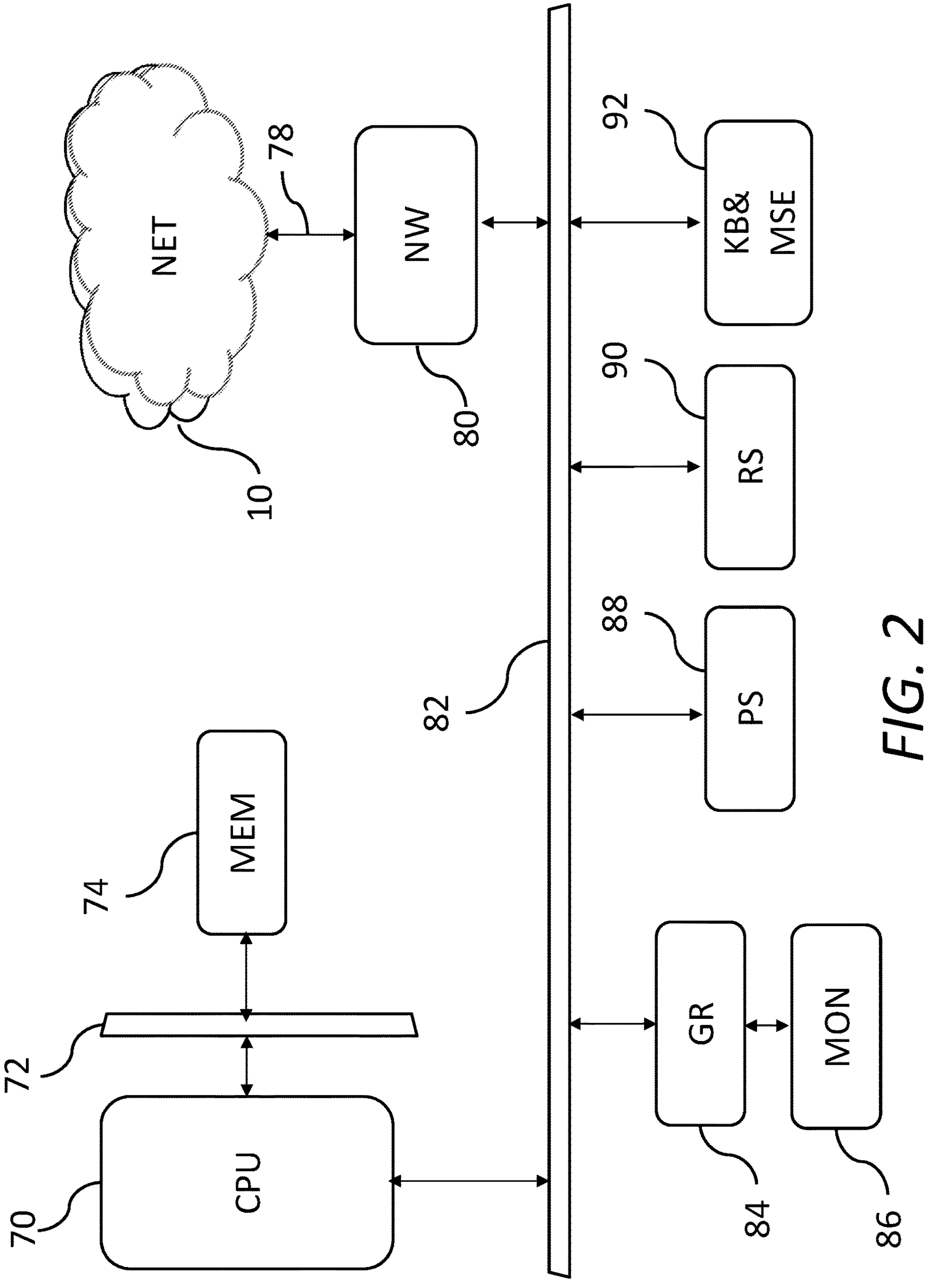
FIG. 2 illustrates a schematic view of a typical computer system.

Referring to FIG. 2, a schematic view of a typical computer system is shown. The example computer system represents a typical computer system used as the game server 40 and/or the participant devices 20. The example computer system is shown in its simplest form, having a single processor. Many different computer architectures are known that accomplish similar results in a similar fashion and the present invention is not limited in any way to any particular computer system. The present invention works well utilizing a single processor system, as shown in FIG. 2, a multiple processor system where multiple processors share resources such as memory and storage, a multiple server system where several independent servers operate in parallel (perhaps having shared access to the data), or any combination, etc. In such systems, a processor 70 executes or runs stored programs that are generally stored for execution within a memory 74. The processor 70 is any processor or a group of processors, for example an Intel® Core™ i9 Processor or the like. The memory 74 is connected to the processor, for example, by a memory bus 72 and is any memory 74 suitable for connection with the selected processor 70, such as SRAM, DRAM, SDRAM, RDRAM, DDR, DDR-2, etc. Also interfaced to the processor 70 is a system bus 82, for example, interfacing peripheral subsystems such as a network interface 80, persistent storage 88 (e.g., a hard disk, solid state disk), removable storage 90 (e.g., DVD, CD, flash drive and portable HDD's and SSD's), a graphics adapter 84 and a keyboard/mouse 92, etc., to the processor 70. The graphics adapter 84 receives commands and displays information from the system bus 82 and generates a display image that is displayed on the display 86.

In general, the persistent storage 88 is used to store programs, executable code, and data such as user financial data in a persistent manner. The removable storage 90 is used to load/store programs, executable code, images, and data onto the persistent storage 88.

These peripherals are examples of persistent storage 88 and other examples of persistent storage 88 include FRAM, flash memory, etc. Other examples of removable storage 90 include HDD, SSD, CDRW, DVD, DVD writeable, Blu-ray, SD cards, other removable flash media, floppy disk, etc. In some embodiments, other devices are connected to the system through the system bus 82 or with other input-output connections/arrangements as known in the industry. Examples of these devices include printers; graphics tablets; joysticks; and communications adapters such as modems and Ethernet adapters.

The network interface 80 connects the computer-based system to the network 10 through a link 78 which is, preferably, a high-speed link such as a cable broadband connection, a Digital Subscriber Loop (DSL) broadband connection, fiber optics, a T1 line, or a T3 line.

Figure 3:
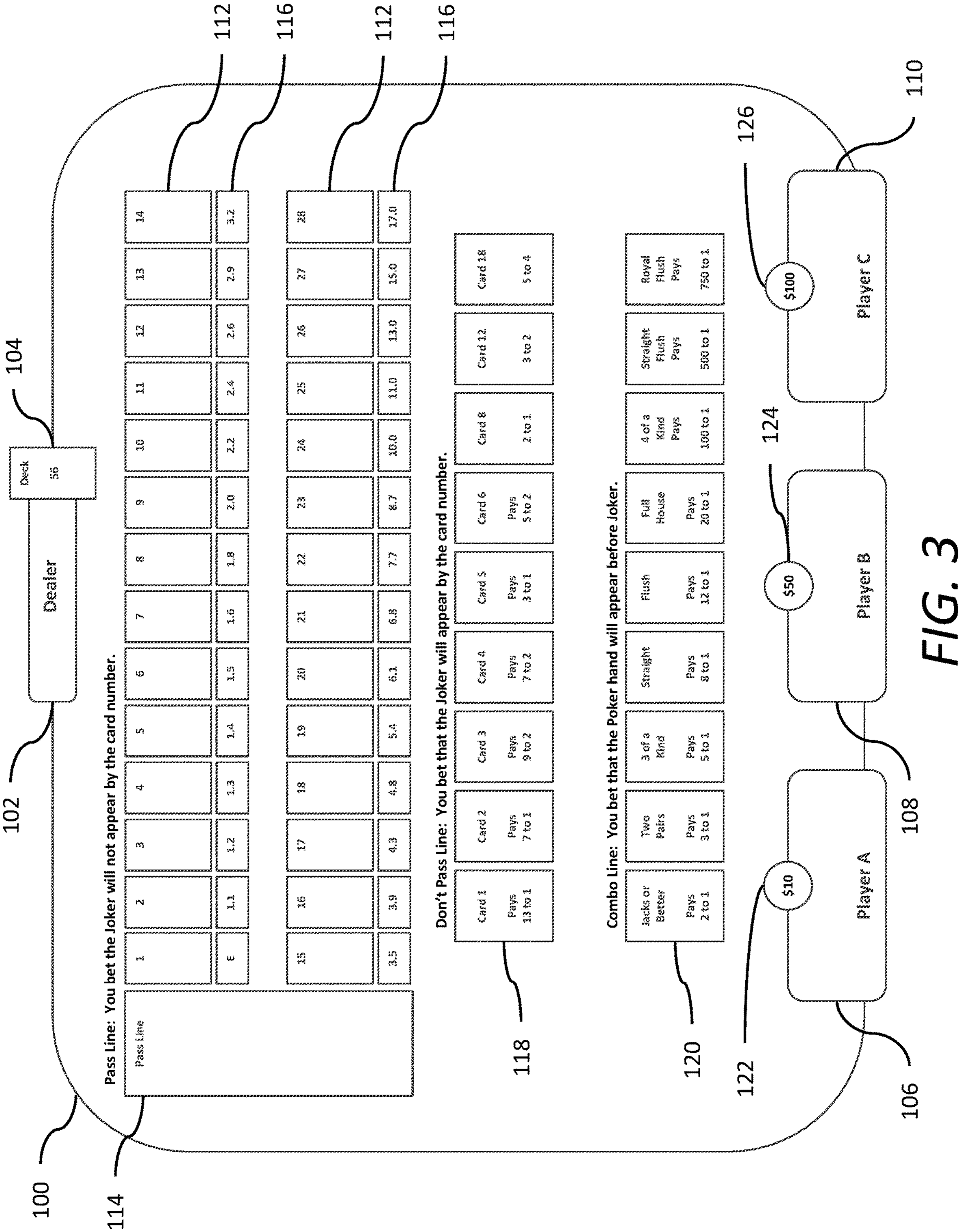
FIG. 3 illustrates a typical gaming table that enables play of the present inventions where the medium and symbols are represented by playing cards that include a standard 52-card playing deck and four terminal cards, represented as Joker cards, with three players playing at the table.

Referring to FIG. 3, a graphic representation of a physical gaming table 100 that includes a Dealer 102, a Deck 104, which is a material representation of 56 symbols that consists of a standard deck of 52 playing cards and four termination cards (Joker cards), Card Place Holders for the playing cards as they are randomly dealt sequentially 112, the Pass Line Box, which is a space for the placement of Pass Line wagers 114 where betting chips are placed related to the number of cards dealt before a termination card is dealt, Pass Line Payout Boxes 116 that represent payout multiples related to the cash out offer multiple offered to players of the Pass Line after a card is dealt that is not a termination card for a given Card Place Holder, Don't Pass Boxes 112 for the placement of Don't Pass wagers that include the relevant payout based on the card number when a termination card is dealt and Combo Boxes 120 for the placement of Poker Line wagers that include the relevant payout based on the achievement of certain symbol combinations (poker hands) before a termination card is dealt. Three players are seated at the table; Player A 106, who is holding a $10 Poker Chip 122; Player B 108, who is holding a $50 Poker Chip 124; and Player C 110, who is holding a $100 Poker Chip 126.

Figure 4:
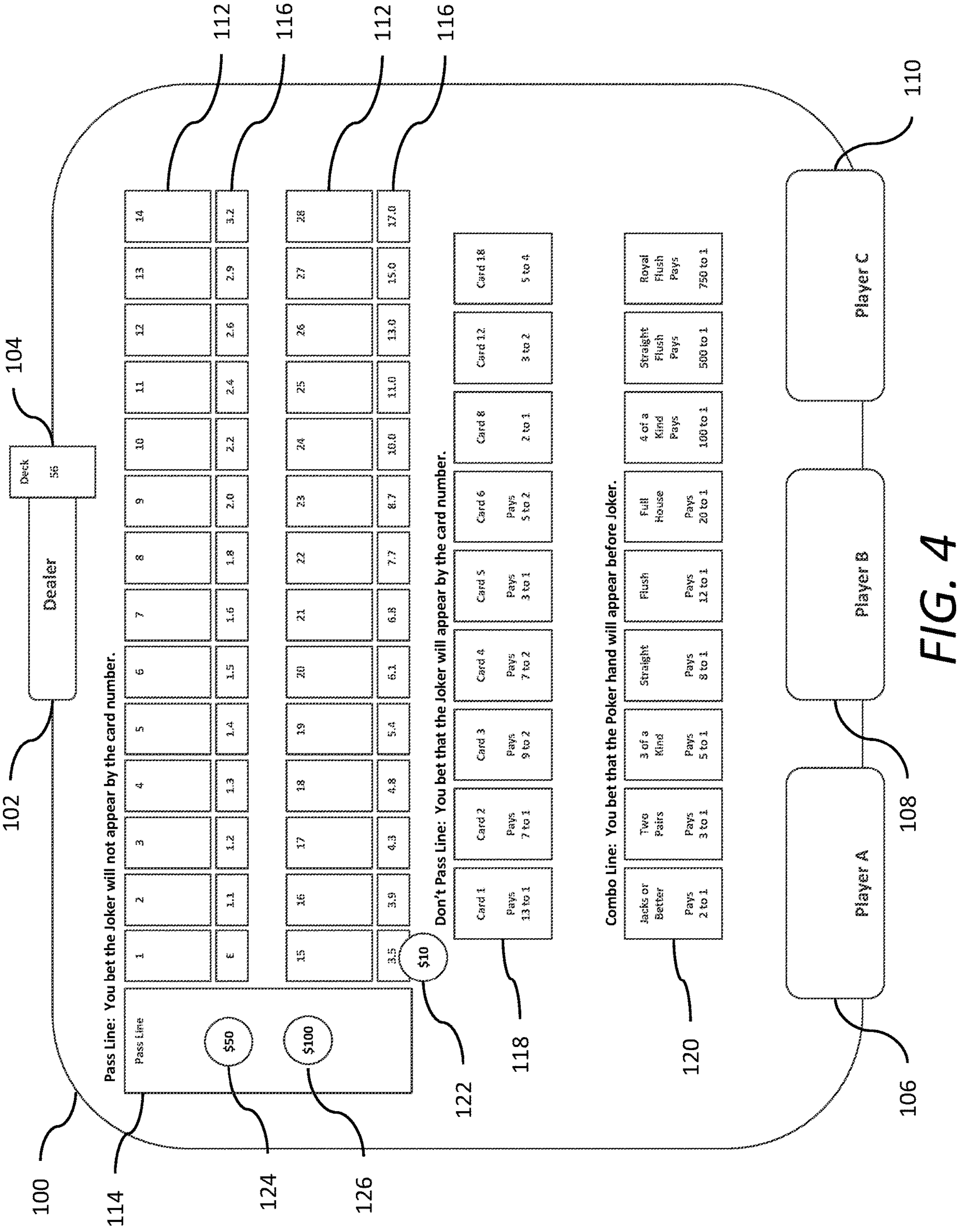
FIG. 4 illustrates the typical gaming table of the present invention wherein, before the game starts, the players have placed bets related to the number of cards that will be dealt before a Joker card is dealt.

Referring to FIG. 4, the physical playing table is represented wherein, before the game begins, Player A 106 places the $10 Poker Chip 122 on a Pass Line Payout Box 116 located under the Card Place Holder 112 for the fifteenth card drawn where the bet will be successful if fifteen cards are drawn before a termination card (a Joker card) is drawn; Player B 108 places the $50 Poker Chip 124 in the Pass Line Box 114 and Player C 110 places the $100 Poker Chip 126 in the Pass Line Box 114 where after each draw from the Deck of Cards 104, the player will have the option to cash out their bet at the amount of their bet times the multiple represented in the corresponding box of the Pass Line Payout Boxes 116 under the last drawn card; however, should a player fail to accept a cash out offer before a termination card (a Joker card) is drawn, they will lose their bet.

Figure 5:
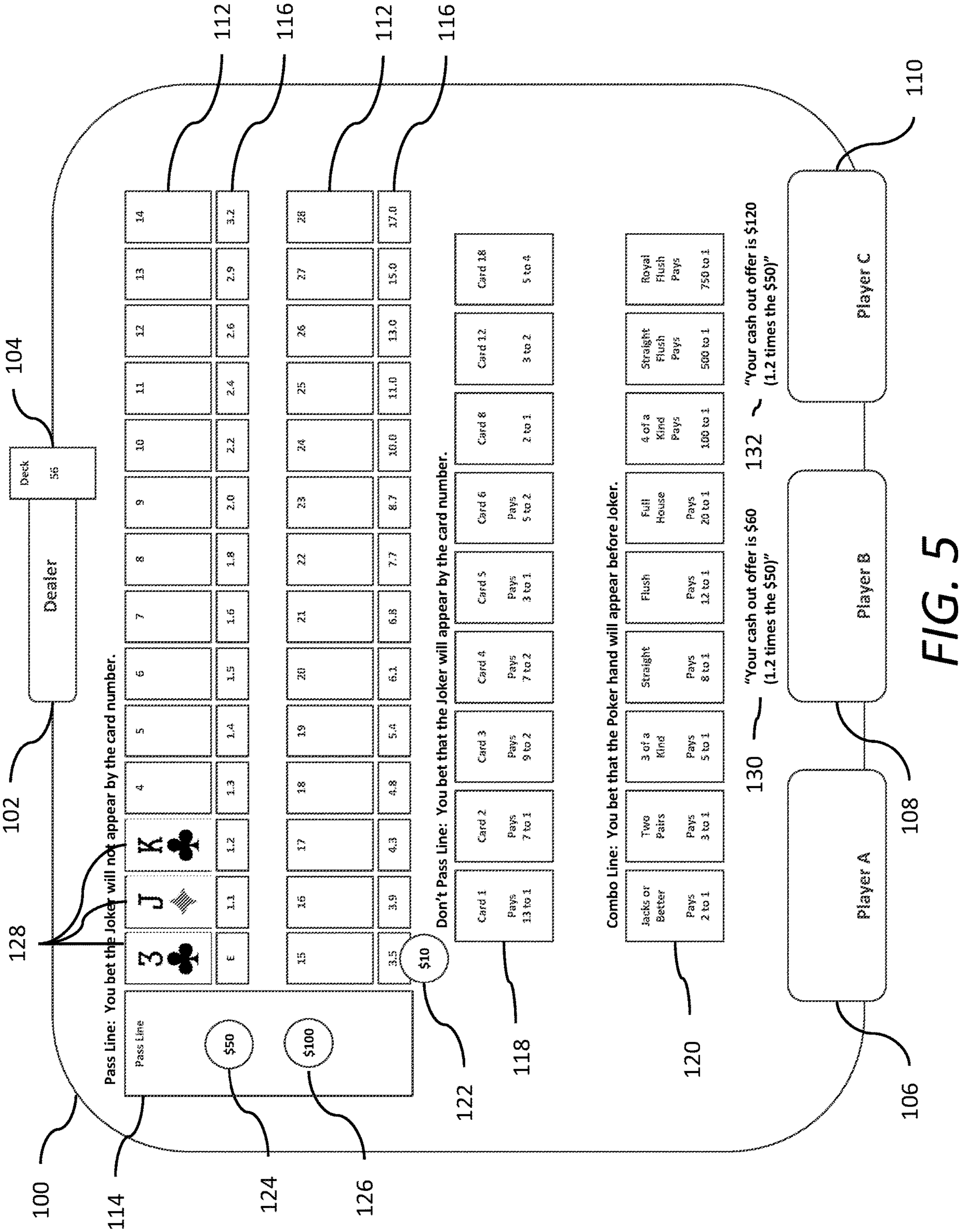
FIG. 5 illustrates the typical gaming table of the present invention after the first series of cards have been dealt and players who bet the Pass Line have been option to cash out their bets at a given payout multiple before the next series of cards are drawn.

Referring to FIG. 5, the physical poker table is represented after the game has started and the Dealer 102 has drawn the first three cards from the Deck of Cards 104 and placed them face up on the Playing Table 100 in their respective boxes of the Card Place Holders 112 where they are noted as Revealed Cards 128. The Dealer 102 conveys a $60 Cash Out Offer 130 to Player B 108 and a $120 Cash Out Offer 132 to Player C 110 sequentially. Each cash out offer represents the player bet multiplied times the multiple listed in the relevant box of the Pass Line Payout Boxes 116 under the third card of the Revealed Cards 128.

Figure 6:
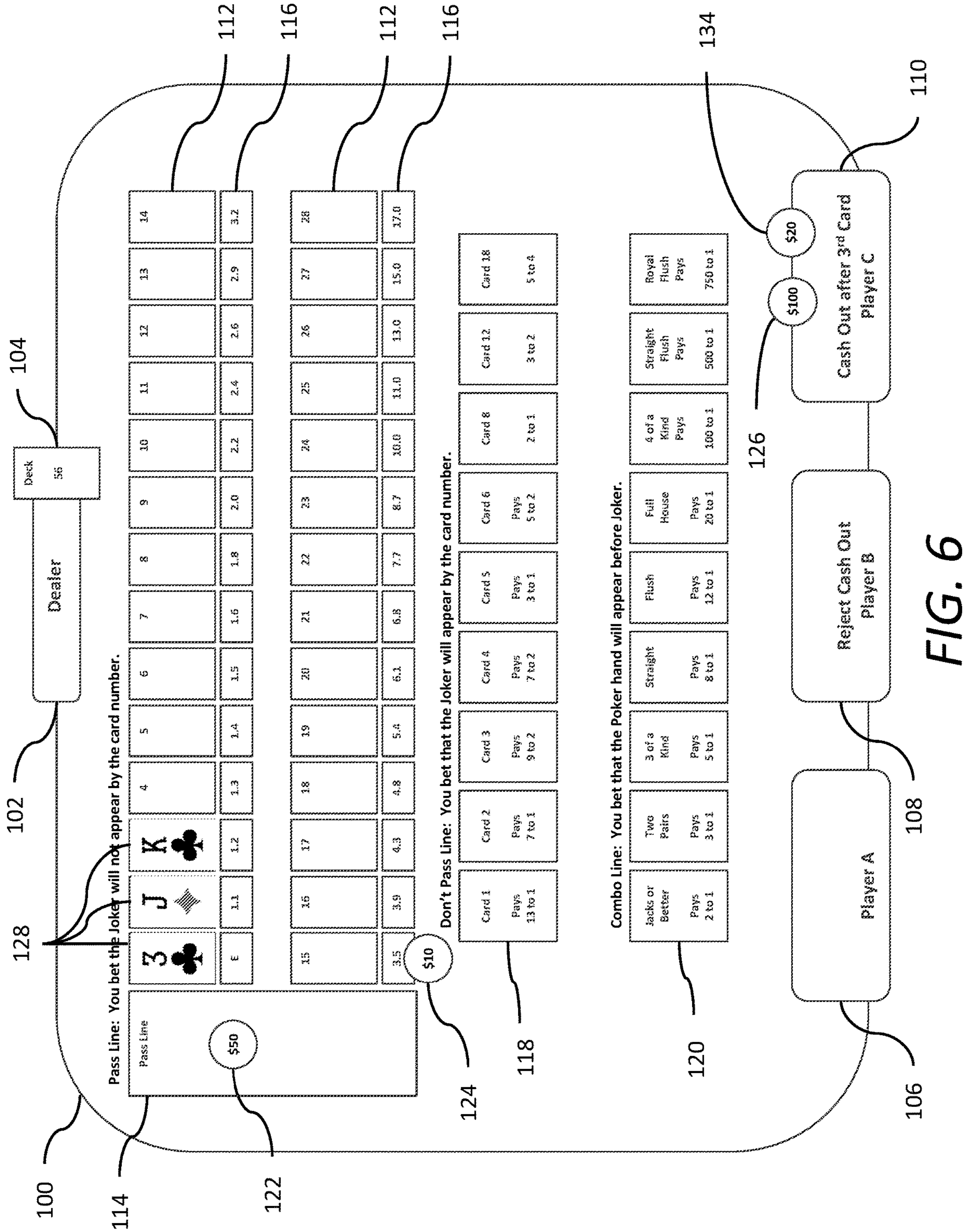
FIG. 6 illustrates the typical gaming table of the present invention after one of the players who bet the Pass Line has accepted the cash out option.

Referring to FIG. 6, the physical table is represented after Player B 106 rejects the dealer cash out offer and Player C 110 accepts the dealer Cash Out Offer 132 and the Dealer 102 returns payment to Player C 110 that includes the $100 Poker Chip 126 and an additional $20 Poker Chip 134.

Figure 7:
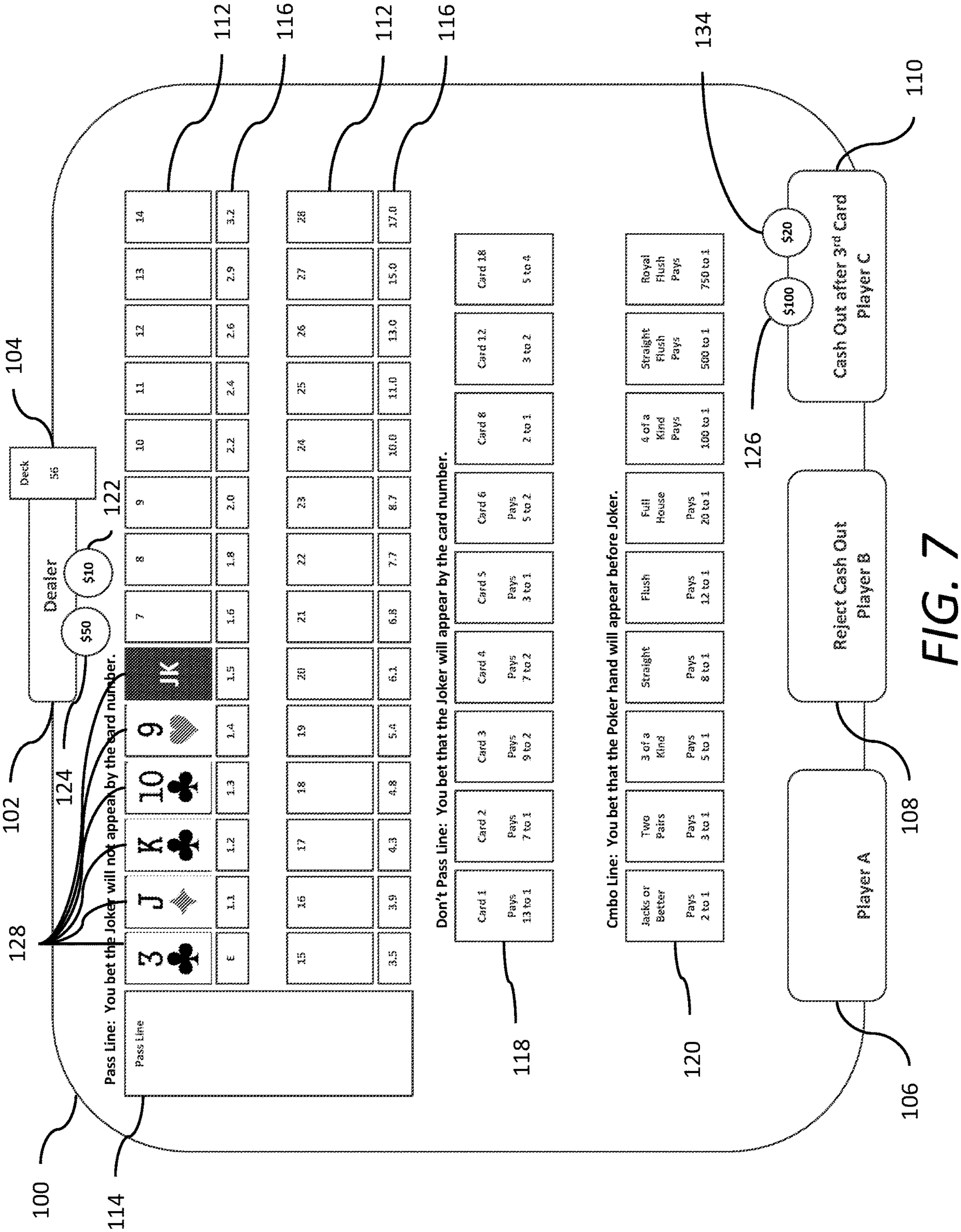
FIG. 7 illustrates the typical gaming table of the present invention after the second series of cards is dealt, a Joker card appears in the second series and the remaining players lose their bets.

Referring to FIG. 7, the physical playing table is represented after three additional cards of the Revealed Cards 128 has been drawn and Player A 106 has lost his $10 bet 122 because a termination card (a Joker card) appeared before the 15th card and Player B 108 has lost his $50 bet because a termination card (a Joker card) appeared before he accepted a cash out offer from the Dealer 102.

Figure 8:
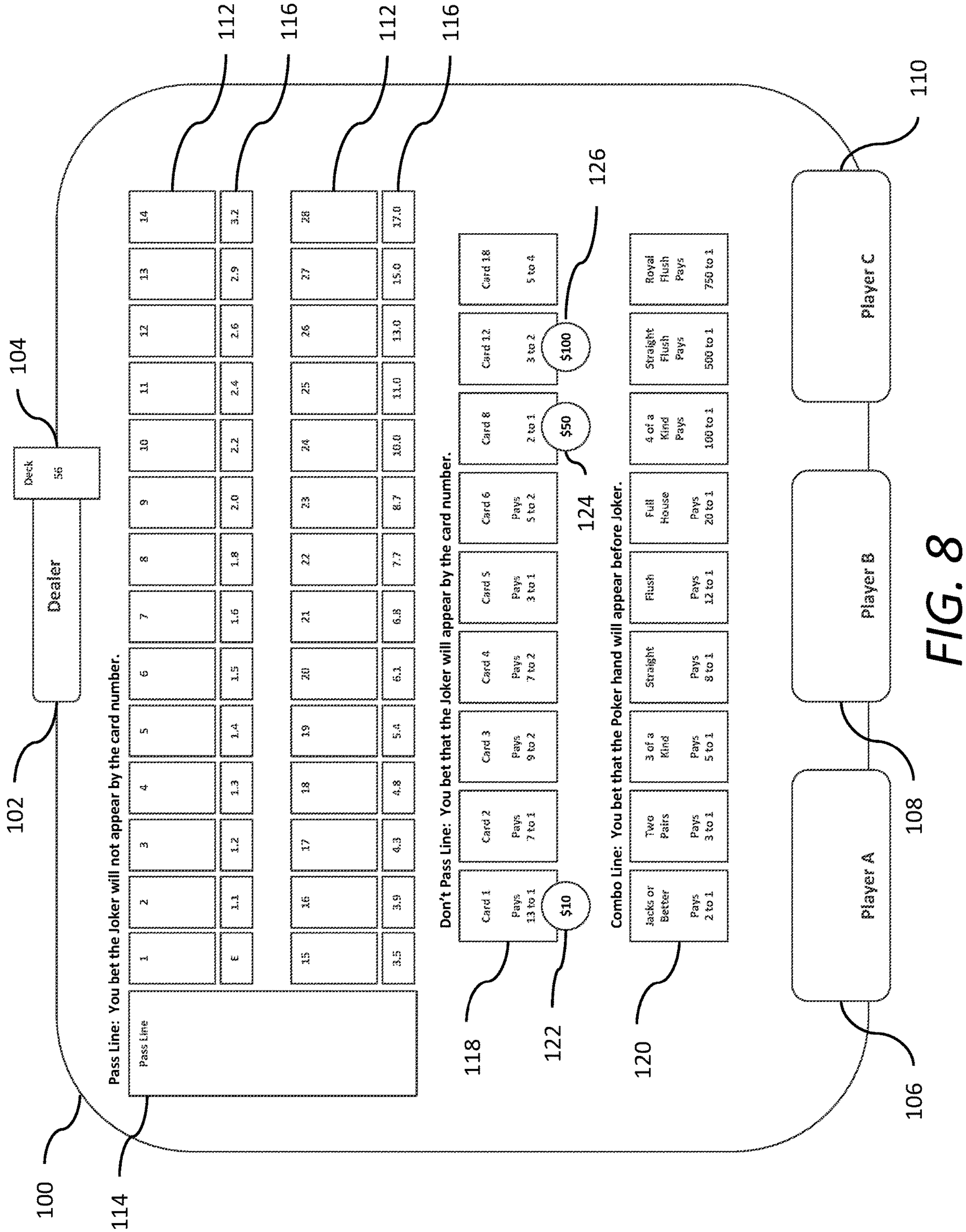
FIG. 8 illustrates the typical gaming table of the present invention wherein, before the game starts, the players have placed bets related to the number of cards dealt when a Joker card is dealt.

Referring to FIG. 8, the physical playing table is represented, wherein before the game begins, Player A 106 has placed the $10 Poker Chip 122 on one of the Don't Pass Boxes 112 where the bet will be successful if a termination card (a Joker card) is the first card drawn; Player B 108 has placed the $50 Poker Chip 124 on one of the Don't Pass Boxes 118 where the bet will be successful if a termination card (a Joker card) is drawn by the eighth card crawn; and Player C 110 has placed the $100 Poker Chip 126 on one of the Don't Pass Boxes 118 where the bet will be successful if a termination card (a Joker card) is drawn by the twelfth card.

Figure 9:
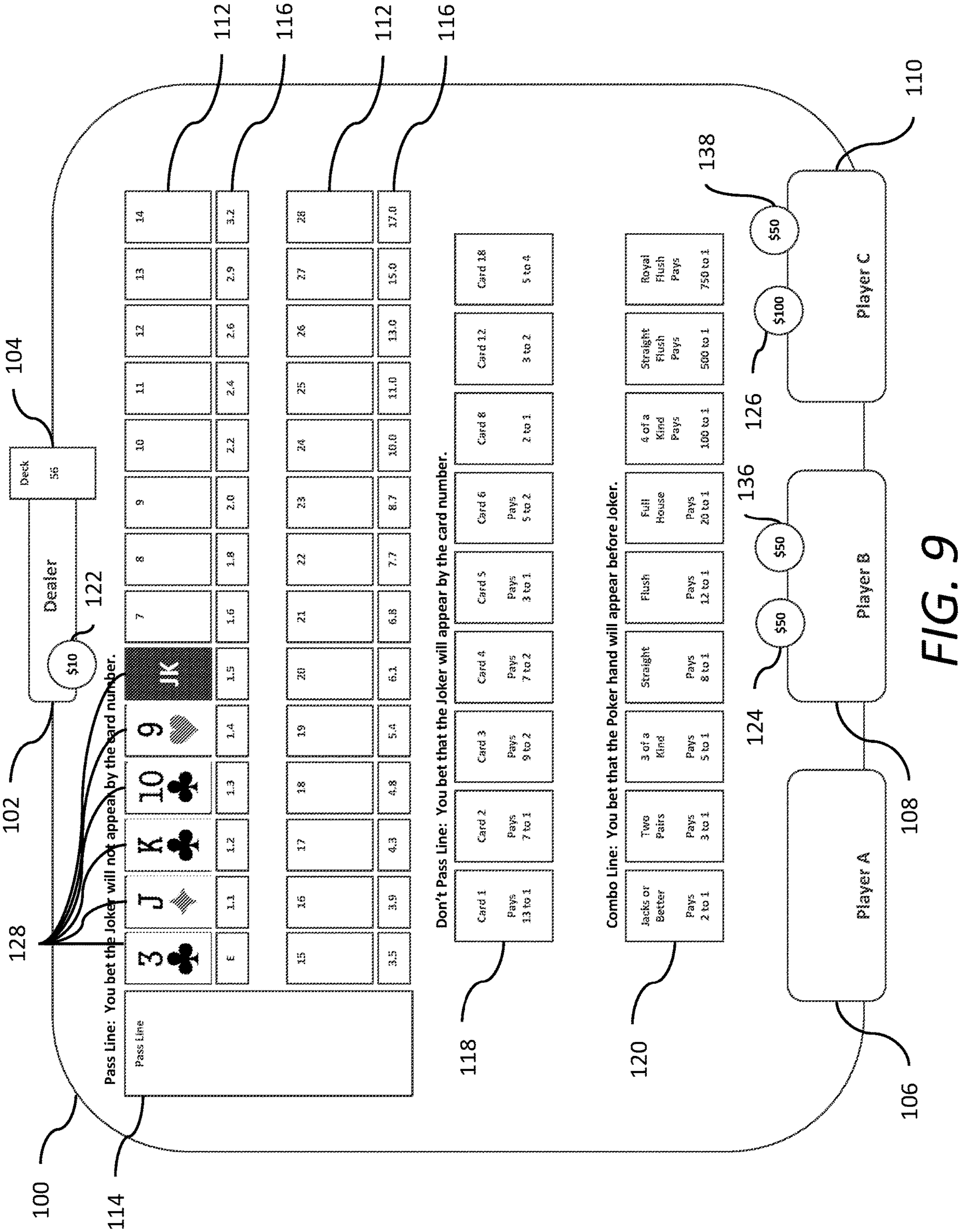
FIG. 9 illustrates the typical gaming table of the present invention after the first six cards have been dealt, wherein the sixth card is a Joker card, and as such the first player loses their bet and the second two players win their bet.

Referring to FIG. 9, the physical playing table is represented after the game is completed and the Revealed Cards 128 indicate that a termination card (a Joker card) was drawn on the sixth card and Player A 106 lost his $10 Poker Chip 122 because a termination card (a Joker card) was not drawn as the first card, and Player B 108 and Player C both won their respective bets because a termination card (a Joker card) was drawn by the eighth twelfth cards respectively and are returned their original betting poker chips and awarded an additional $50 Poker Chip 136 and $100 Poker Chip 138 by the Dealer 102.

Figure 10:
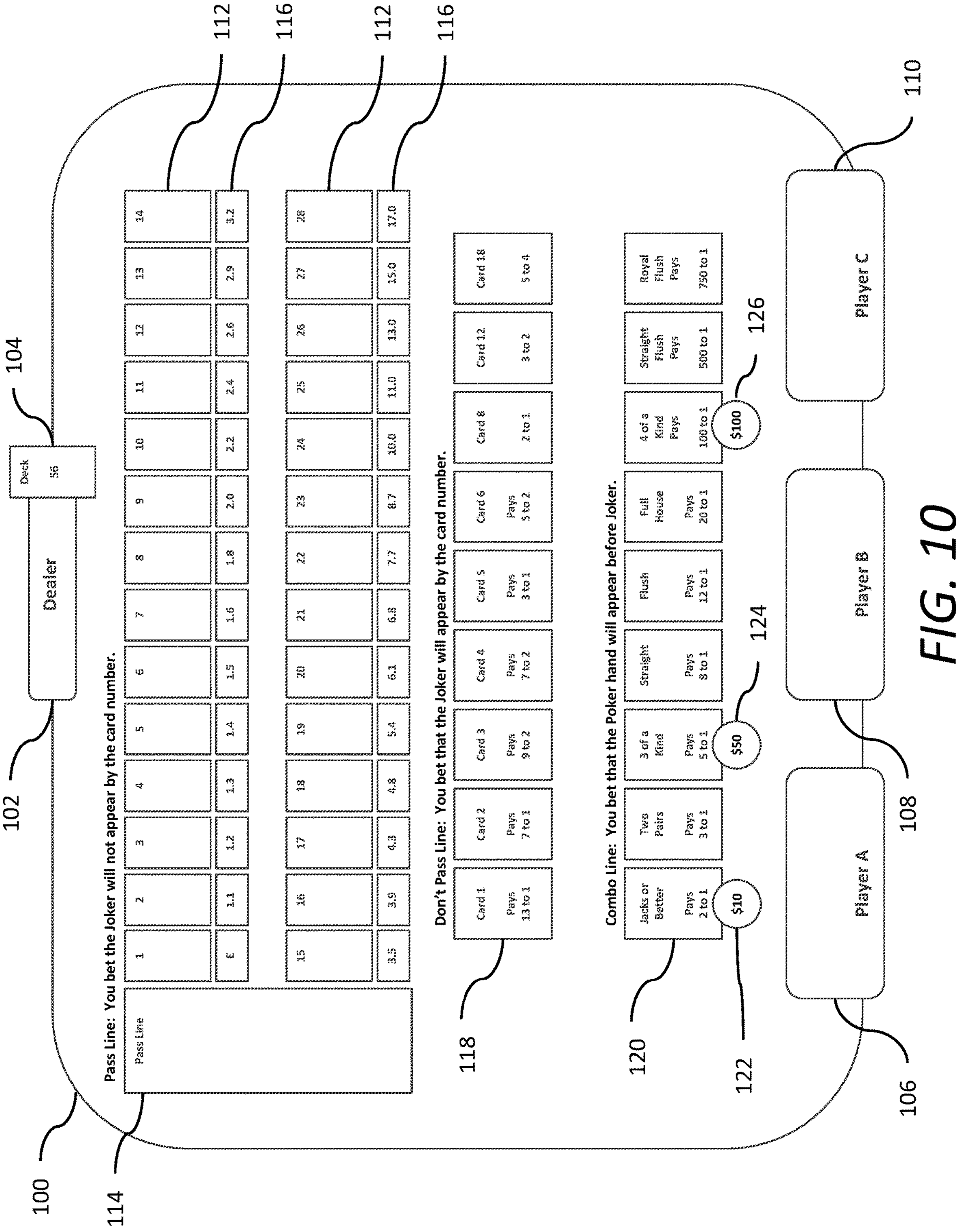
FIG. 10 illustrates the typical gaming table of the present invention wherein, before the game starts, the players have placed bets related to the achievement of certain symbol combinations, represented by poker hands, before a Joker card is dealt.

Referring to FIG. 10, the physical playing table is represented, where in before the game begins, Player A 106 has placed the $10 Poker Chip 122 on one of the Combo Boxes 120 where the bet will be successful if two jacks, two queens, two kings or two aces ("jacks or better") appear before a termination card (a Joker card) is drawn; Player B 108 has placed the $50 Poker Chip 124 on one of the Combo Boxes 120 where the bet will be successful if any three of the same symbols (a "three of a kind") are drawn before a termination card (a Joker card) is drawn; and Player C 110 has placed the $100 Poker Chip 126 on one of the Combo Boxes 120 where the bet will be successful if any four of the same symbols are drawn before a termination card (a Joker card) is drawn.

Figure 11:
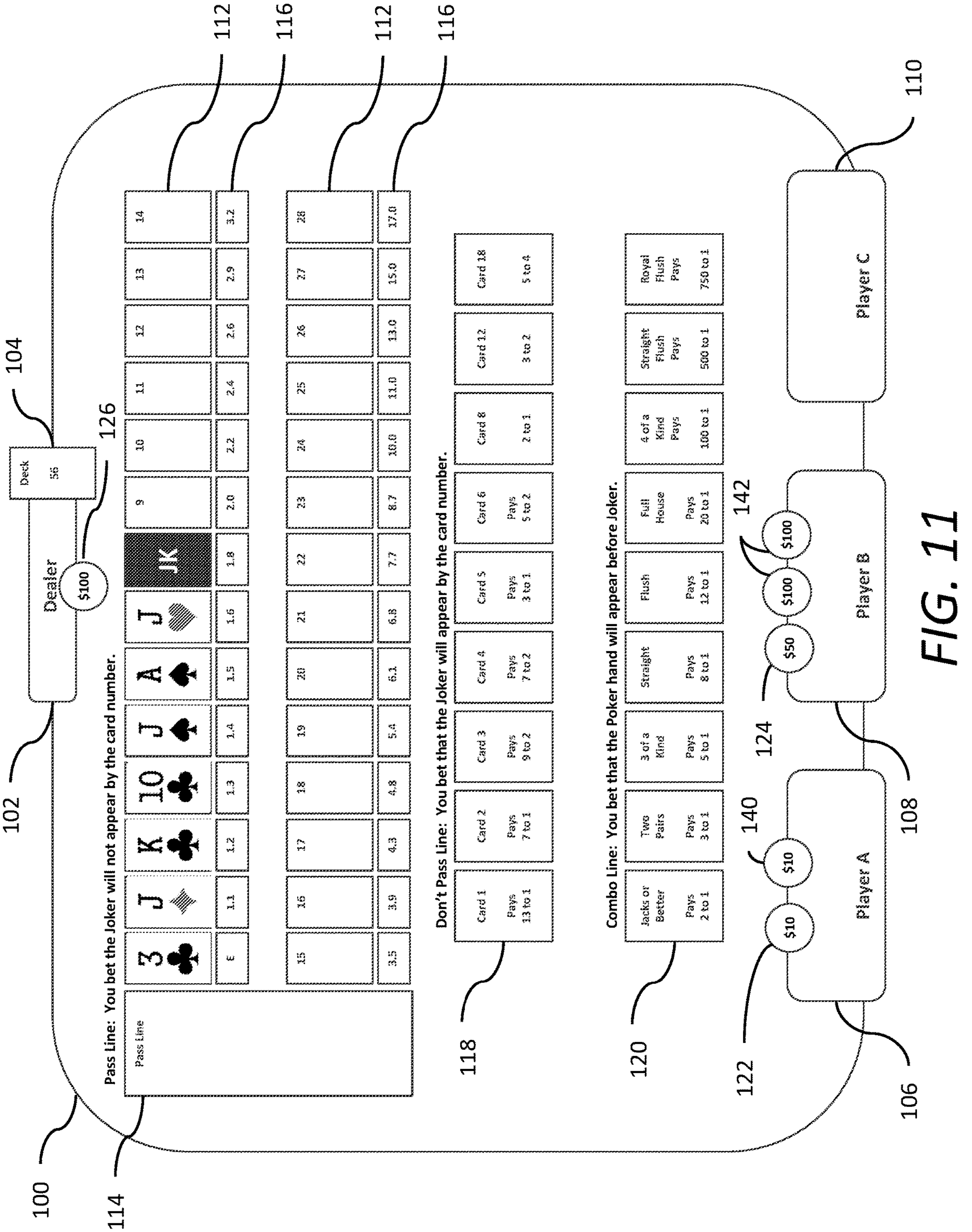
FIG. 11 illustrates the typical gaming table of the present invention after the first eight cards have been dealt, wherein the eight card is a Joker card, and as such the first two players win their bets and the third player loses their bet.

Referring to FIG. 11, the physical playing table is represented after the $8^{th}$ card is revealed as shown by the Revealed Cards 128, Player A 106 has won their bet because a pair of jacks was included in the Revealed Cards 128 and is returned the $10 Poker Chip 122 by the Dealer 102 along with an additional $10 Poker Chip 140, which represents the multiple indicated on the box their bet was placed in the Combo Line Boxes 120 multiplied times their bet; Player B 108 has won their bet because three jacks were included in the Revealed Cards 128 and is returned the $50 Poker Chip plus awarded two $100 Poker Chips 142 by the Dealer 102, which represents the multiple indicated on the box their bet was placed in the Combo Line Boxes 120 multiplied times their bet; and Player C 110 has lost their bet because a termination card (a Joker card) was drawn before the requisite symbol combination (four of the same symbol) was included in the Revealed Cards 128.

Figure 12:
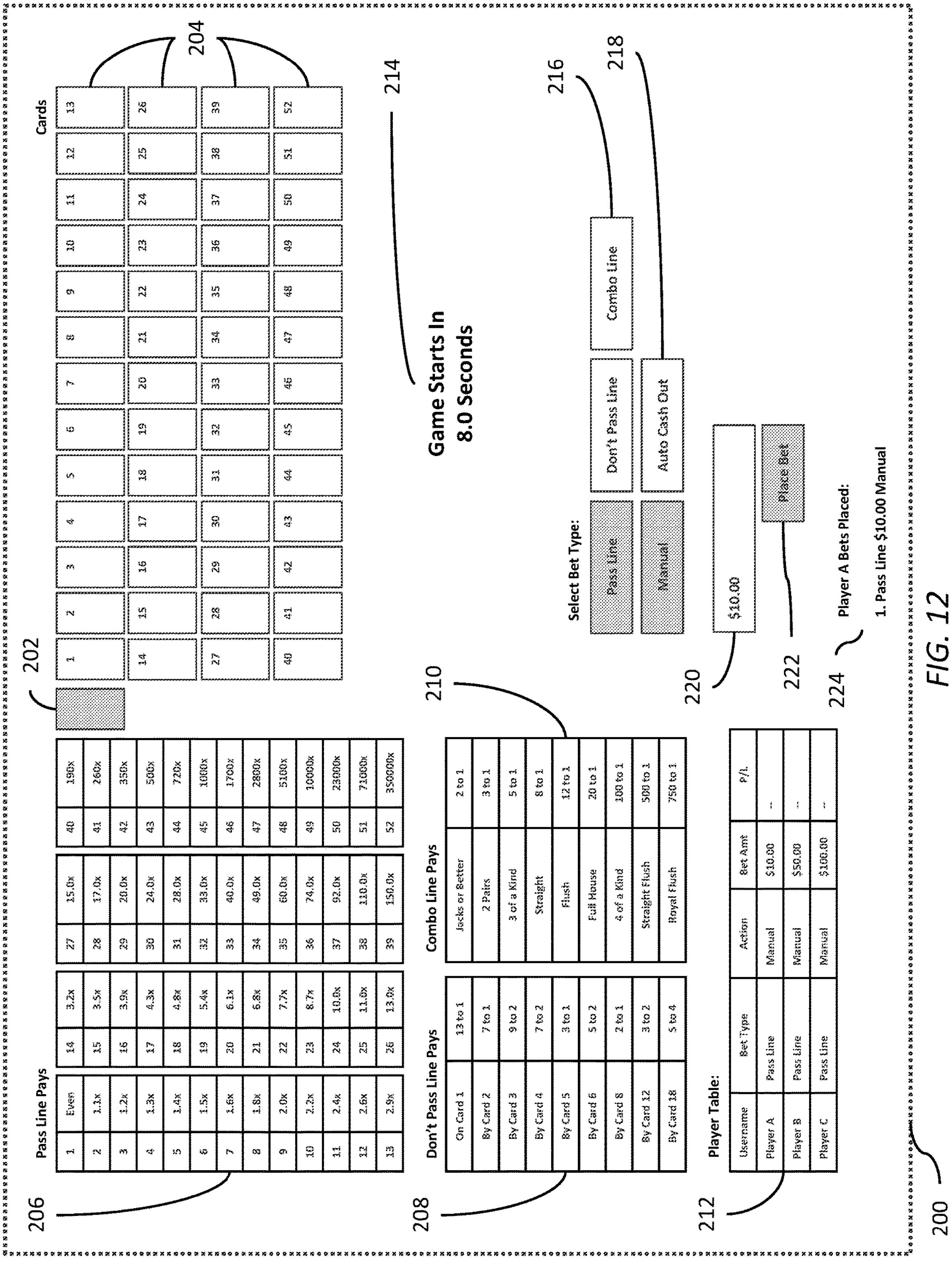
FIG. 12 illustrates a computer user-interface of the present invention that enables an entrant (i.e., player) to place bets, understand the potential payout of those bets, track game play and track the play of other entrants/players of the present invention and wherein, before the game starts, the user has placed a manual bet related to the number of cards that will be dealt before a Joker card is dealt and the bets of other users are displayed.

Referring to FIG. 12, a user interface with a graphic representation of a playing table 200 that includes a Card Deck 202 that includes a graphically rendered deck of playing cards that includes cards from a standard 52-card deck and four termination cards (Joker cards), Card Place Holders 204 that will hold the playing cards after they are randomly dealt, a Pass Line Payout Table 206 that shows the payout multiple for cash out offers to be presented to players that is based on the cumulative number of cards drawn before a termination card (a Joker card) is drawn, a Don't Pass Line Payout Table 208 that shows the payout multiple applied to hands where the wager is based on the number of cards drawn by when a termination card (a Joker card) is drawn, a Combo Line Payout Table 210 that shows the payout multiple applied to hands where the wager is based on the achievement of a specific poker hand combination before a termination card (a Joker card) is drawn, a Player Table 212 that shows the activity of all or a sub-set of players who are playing the game, the Game Information Section 214 where game announcements are located, the Bet Type Controls 216 that enable the player to select the type of wager to be placed (Pass Line, Don't' Pass Line and Combo Line), the Bet Type Sub-Controls that enable a player to select whether the bet is a manually controlled bet or an auto cash out bet, a Wager Amount Box 220, a Place Bet Button 222 that is depressed by a player to place the bet with the server and a Bet Confirmation Box 224 that confirms that a bet has been placed and provides its specific details, where before the game starts, the player (represented as Player A in the Player Table 212), who is playing remotely, selects a Pass Line bet from Bet Line Controls 216, selects Manual from the Bet Type Sub-Controls 218, inputs $100 in the Wager Amount Box 220, clicks the Place Bet Button to submit the bet to the server, the server updates the Player Table 212 to report that the player is playing along with two additional players and updates the Bet Confirmation Box 224 to show the parameters of the bet placed.

Figure 13:
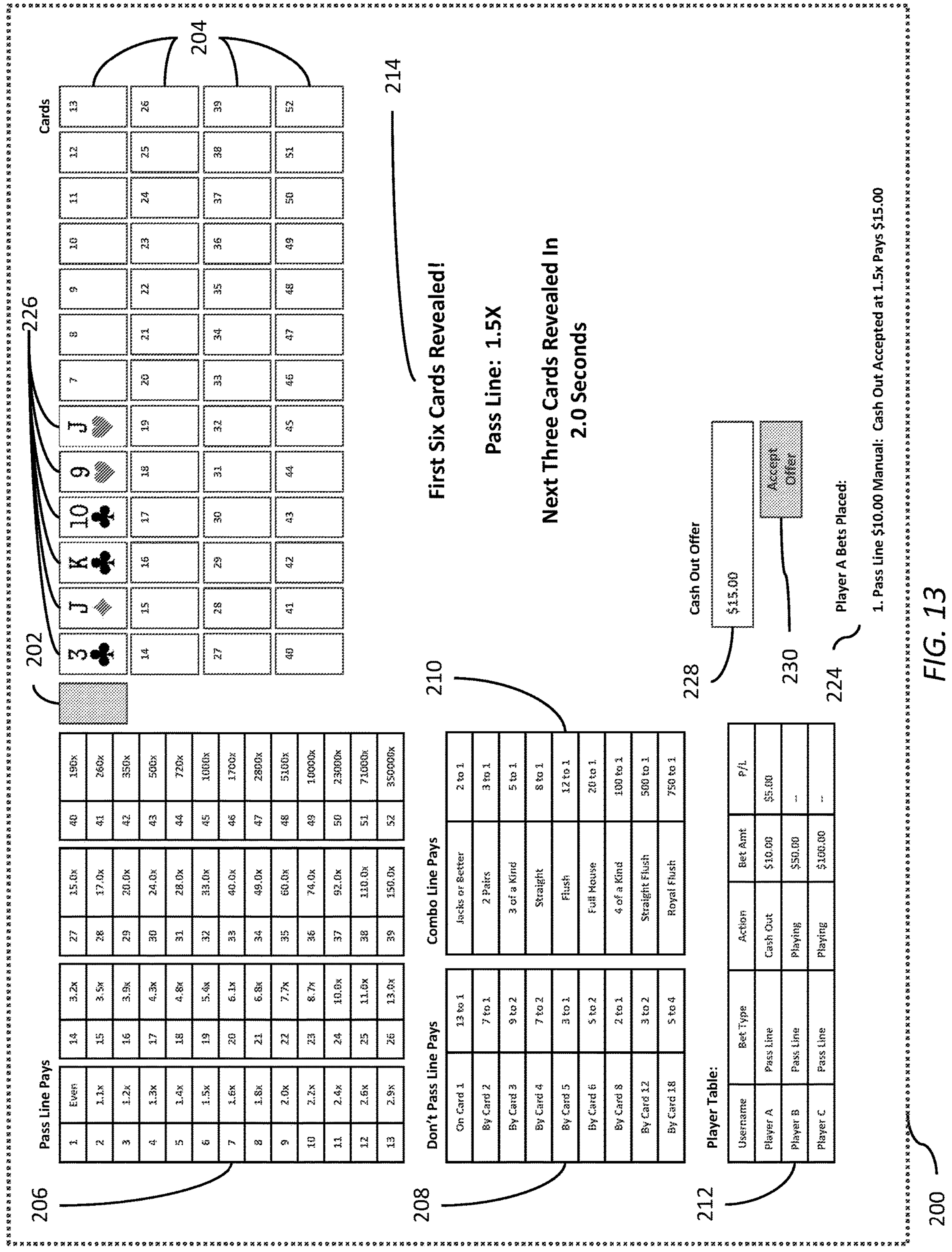
FIG. 13 illustrates the user-interface of the present invention after the sixth card is revealed to be other than a Joker card and the user is presented with, and accepts, a cash out offer.

Referring to FIG. 13, the graphically rendered table is shown after the first six cards have been drawn and are shown as Revealed Cards 226, the Game Information Section 214 is updated, a Cash Out Offer 228 of $15.00, which represents Player A's bet multiplied times 1.5, which is the multiple adjacent to the sixth card slot of the Pass Line Payout Table 206 and is presented to the player in the Cash Out Offer Box 228 and the player clicks the Accept Offer Button 230 to accept the cash out offer and the Player Table 212 and the Bet Confirmation Box 224 are updated to reflect the player's acceptance of the cash out offer.

Figure 14:
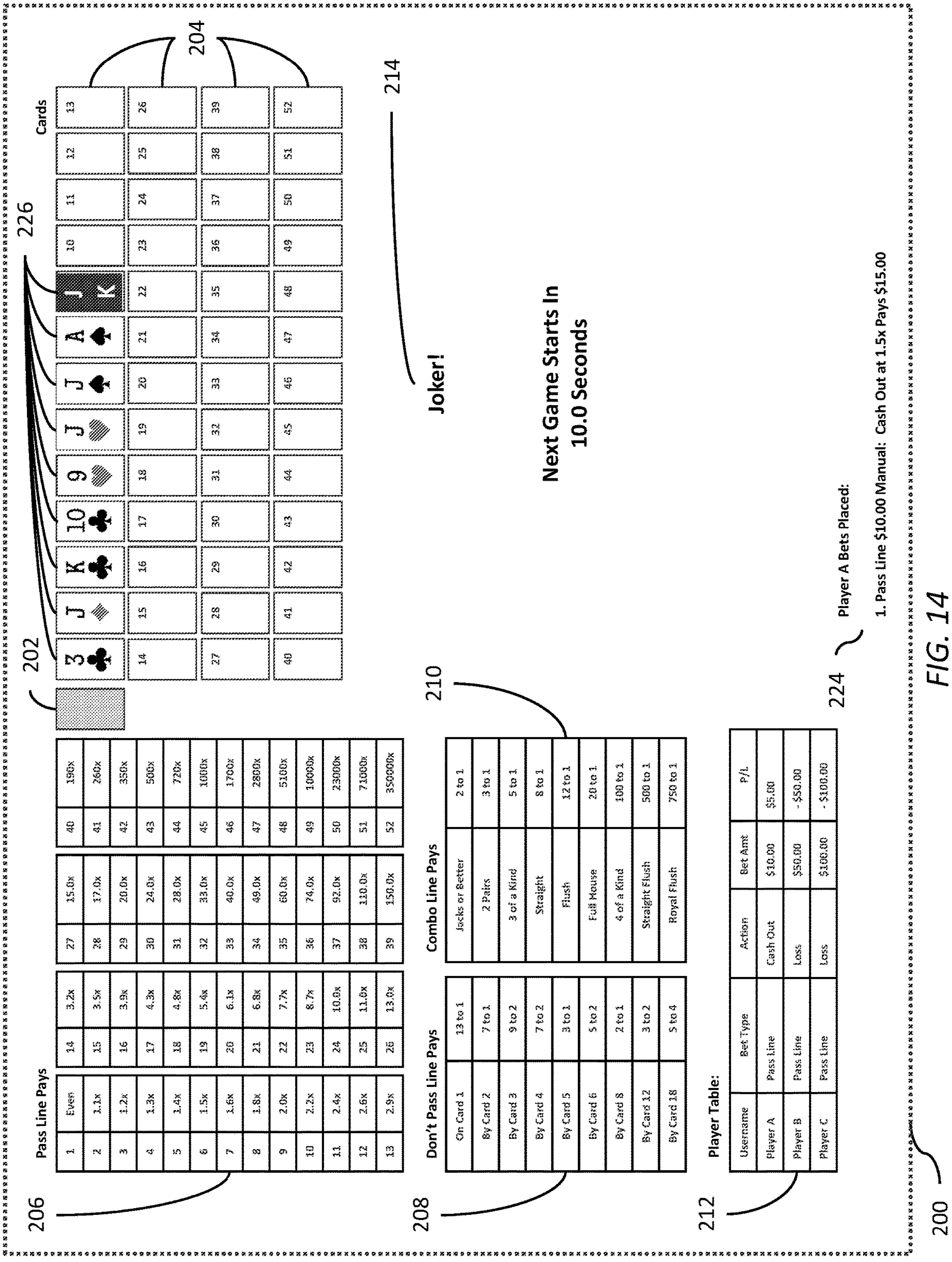
FIG. 14 illustrates the user-interface of the present invention after the ninth card is revealed to be a Joker card, such that the other players still playing lose their bets and the game ends.

Referring to FIG. 14, the graphically rendered table is shown after the ninth card is drawn and shown as Revealed Cards 226 where the ninth card drawn is a termination card (a Joker card) and the Player Table 212 is updated to indicate that the other players playing lost because they failed to cash out before a termination card was drawn and the Game Information Section 214 is updated to reflect the drawing of a termination card and to inform the players that the round has ended and that t new round will start in ten seconds.

Figure 15:
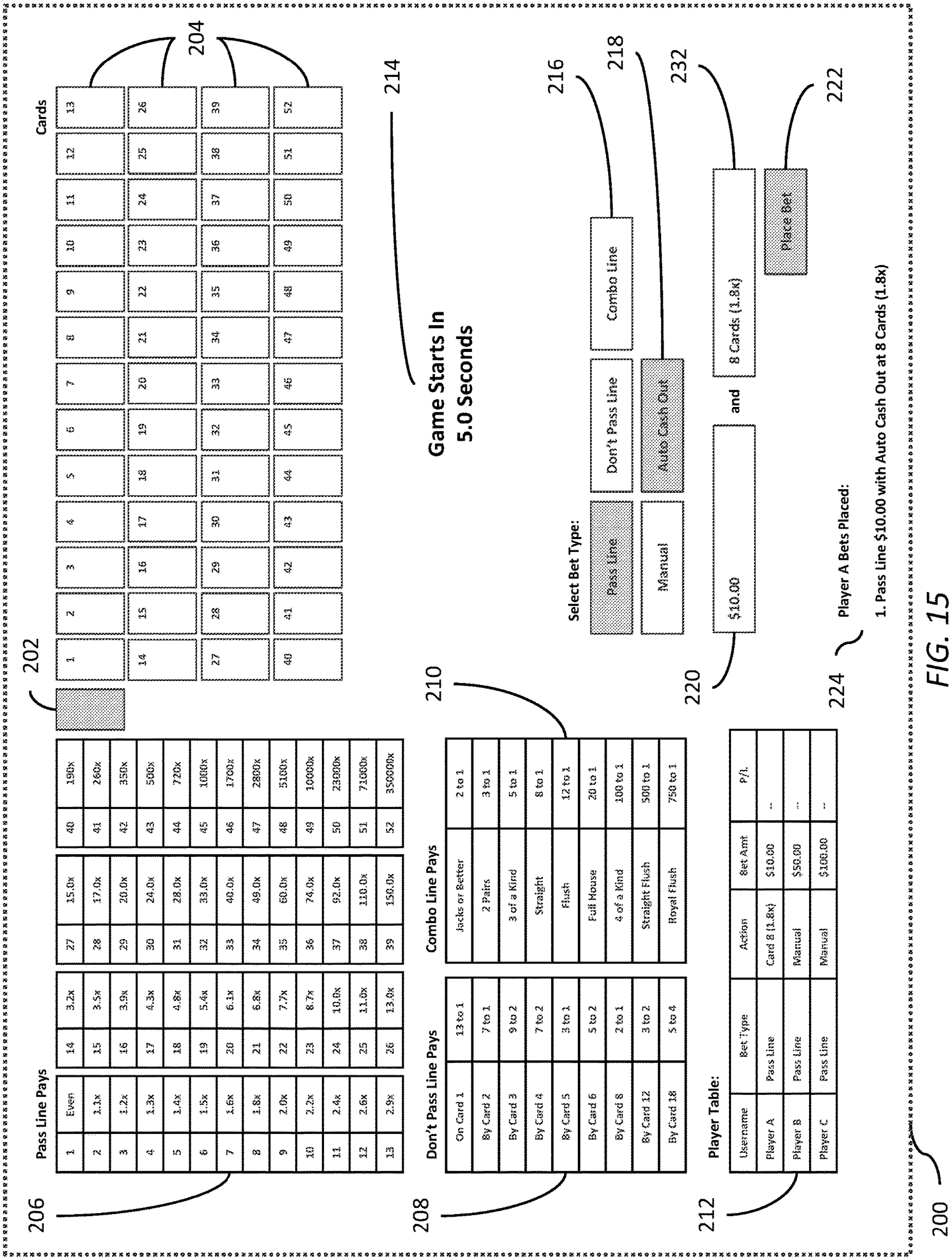
FIG. 15 illustrates the user-interface of the present invention wherein, before the game starts, the user places an auto cash out bet related to the number of cards that will be dealt before a Joker card is dealt and the bets of other users are displayed.

Referring to FIG. 15, the graphically rendered table 200 is shown before the start of the next round of play, the player has selected the auto cash out button in the Bet Type Sub-Menu 218, entered $10.00 in the Wager Amount Box 220, selected the eight card auto cash out amount in the Pass Line Auto Cash Out Box 232, which means that their bet will automatically be cashed out if a termination card (a Joker) is not drawn within the first eight cards drawn and clicked the Place Bet Button 222 to place the bet and the Player Table 222 and Bet Confirmation Box 224 are updated to reflect the player's bet.

Figure 16:
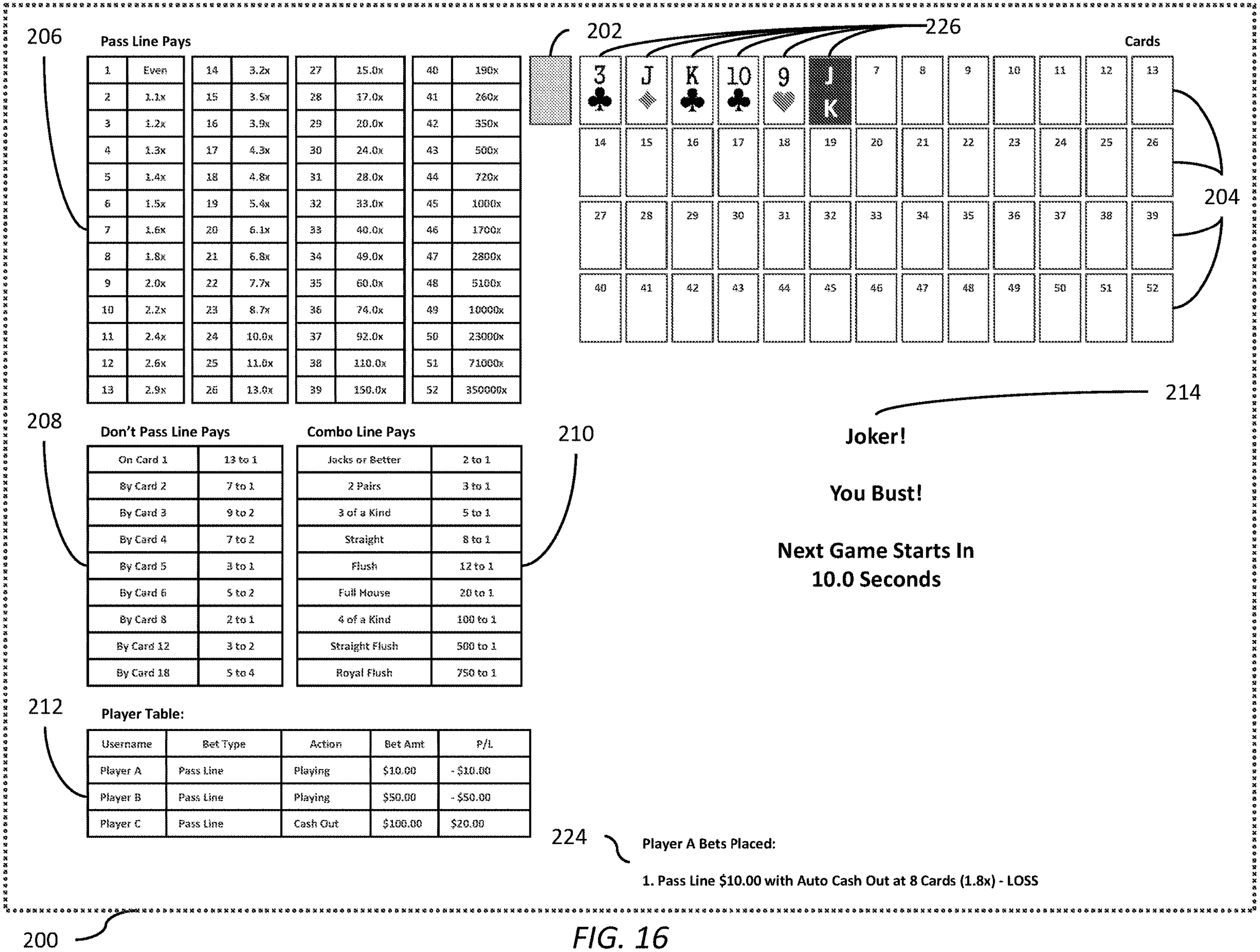
FIG. 16 illustrates the user-interface of the present invention after the sixth card is revealed to be a Joker card, the user loses his wager.

Referring to FIG. 16, the graphically rendered table 200 is shown after the sixth card is drawn and displayed amongst the Revealed Cards 226, the Game Information Section alerts the player that a termination card has been drawn before their auto cash out which was set for the eighth card, that the player busted and lost the bet and that a new game was starting in ten seconds, and the Player Table 212 is updated to reflect the player's loss and the status of the other players and the Bet Confirmation Box 224 is updated to reflect the player's loss.

Figure 17:
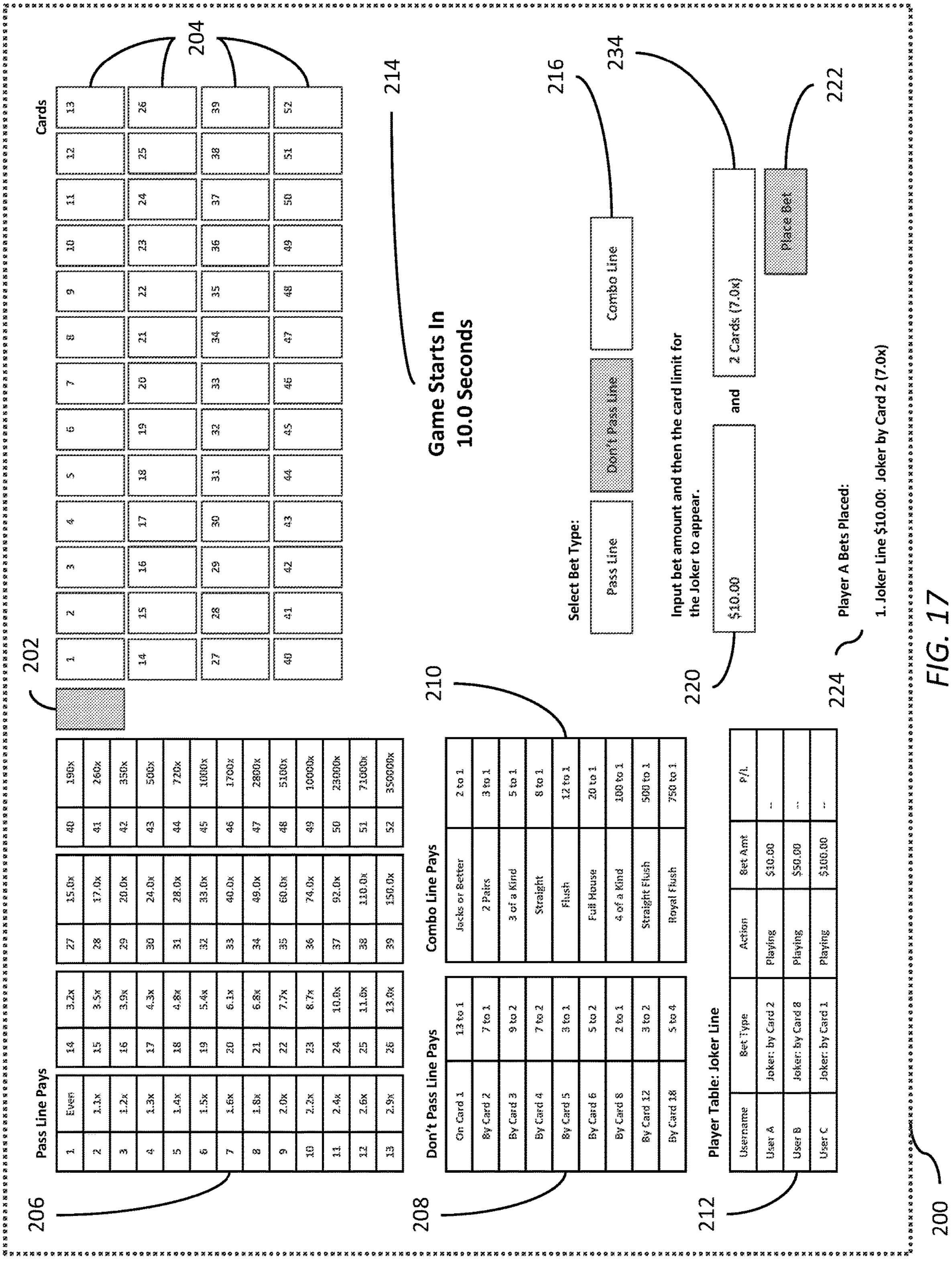
FIG. 17 illustrates the user-interface of the present invention wherein, before the game starts, the user places a wager related to the number of cards dealt when a Joker card is dealt, and the bets of other users are displayed.

Referring to FIG. 17, the graphically rendered table 200 is shown before the start of the next round of play, the player has selected the don't pass button in the Bet Type Controls 216, entered $10.00 in the Bet Amount Box 220, selected the two card option in the Don't Pass Line Cash Out Box, which means that the bet will be successful if a termination card (a Joker) appears by the second card, and clicked the Place Bet Button 222 to place the bet, and the Player Table is updated to reflect the player's bet and the bets of the other players playing and the Bet Confirmation Box 224 is updated to reflect the player's bet.

Referring to FIG. 18, the graphically rendered table 200 is shown after the first two cards have been revealed and displayed amongst the Revealed Cards 226 where the termination card (a Joker) was the second card drawn and Player Table 212 is updated to reflect the winning bet of the player and the bet performance of the other players and the Bet Confirmation Box 224 is updated to reflect the player's win.

Figure 19:
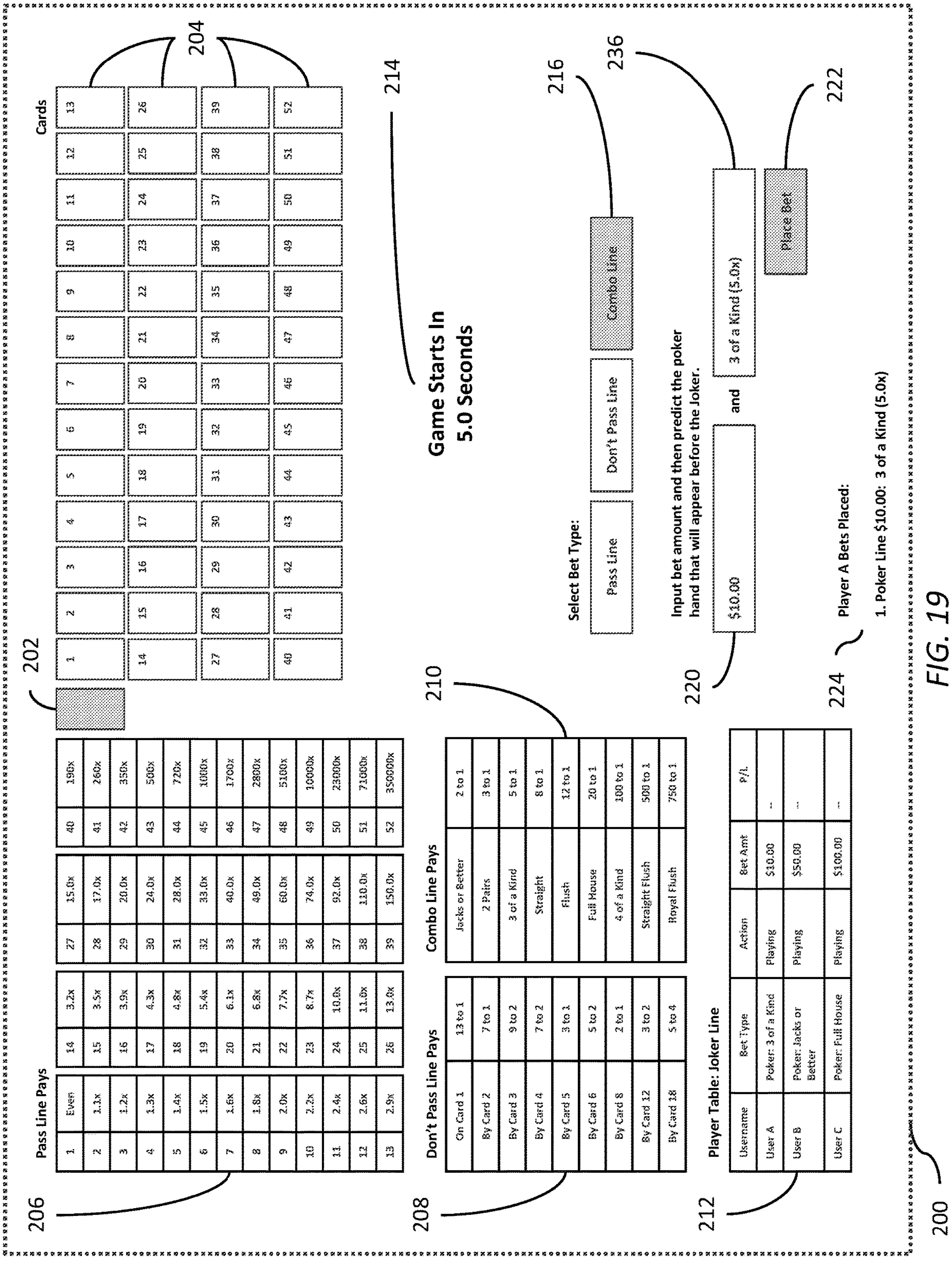
FIG. 19 illustrates the user interface of the present invention wherein, before the game starts, the user places a wager related to the achievement of certain symbol combinations, represented by poker hands, before a Joker card is dealt and the bets of other users are displayed.

Referring to FIG. 19, the graphically rendered table 200 is shown before the start of the next round of play, the player has selected the Combo Line in the Bet Type Controls 216, entered $10.00 in the Bet Amount Box 220, selected the three of a kind option in the Combo Line Cash Out Box, which means that the bet will be successful if three cards of the same value (e.g., three eight's, Jacks, Kings, etc.) are drawn before a termination card (a Joker card) is drawn, and clicked the Place Bet Button 222 to place the bet, and the Player Table is updated to reflect the player's bet and the bets of the other players playing and the Bet Confirmation Box 224 is updated to reflect the player's bet.

Figure 20:
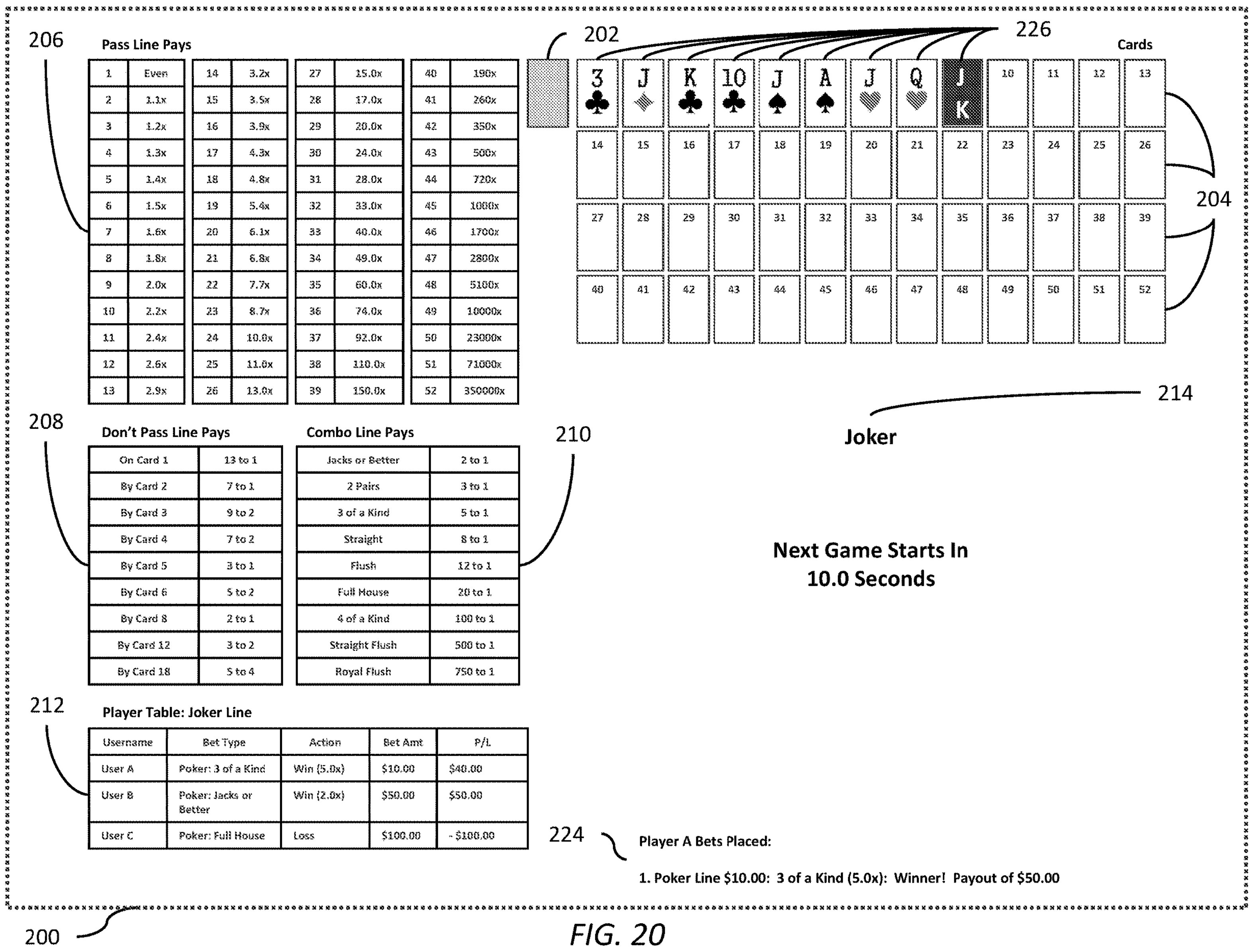
FIG. 20 illustrates the user interface of the present invention after the ninth card is revealed to be a Joker card, and as such the user wins his bet and one of the other users wins his bet while another loses his bet.

Referring to FIG. 20, the graphically rendered table 200 is shown after the first nine cards have been revealed and displayed amongst the Revealed Cards 226 where the termination card (the Joker card) was the ninth card drawn and the Player Table 212 is updated to reflect the winning bet of the player and the bet performance of the other players and the Bet Confirmation Box 224 has been updated to reflect the player's win.

What is claimed is:

1. A gaming system comprising:

a server;

a plurality of player devices connected to the server each associated with a player, the player devices displaying a graphic representation of a physical gaming table that contains marked locations for the placement of drawn symbols as they are randomly drawn and revealed by the server, a game message window, a bet confirmation window, and a player table;

also accessible through the client devices are a pass line payout table, a do not pass line payout table, a combo line payout table;

a set of x symbols that includes y non-termination symbols and z termination symbols where the symbols are graphically represented once drawn and displayed on player client devices;

and wherein the server starts an initial time period and requests a wager concurrently from each client device;

thereafter, the server displays player betting type controls on the player client devices that enable a player to select the type of bet they wish to place, including manual pass line bets, which are bets that provide the bettor with the option to cash out their bet after each subsequent non-termination symbol is drawn before a termination symbol is drawn; auto cash out pass line bets, which are bets based on the number of non-termination symbols being drawn before a termination symbol is drawn; specific don't pass line bets, which are bets based on the specific number of symbols by when a termination symbol is drawn where a winning bet occurs if a termination symbol is drawn by the number predicted; and combination line bets, which are bets based on the drawing of a specific single non-termination symbol or combination of non-termination symbols before a termination symbol is drawn; the server also displays a bet amount entry field and a place bet button on the client devices;

such that after the initial time period ends, for the each player client device that placed a wager within the initial time period, the server collects the wager, debits the account of the player, updates the bet confirmation window of the each client device with the parameters of the bet and updates the player table on the each client device by including the usernames of the players playing and their respective wager amount;

and wherein the server then initiates the first round of play, randomly draws the first symbol from the set of symbols and then displays the first symbol on a display of each client device; If the first symbol is a termination symbol, then all pass line bets and combo bets lose and all don't pass line bets win and the server credits the account of each winning bettor the amount of their bet multiplied times the corresponding payout multiple from the don't pass payout table associated with their bet and then terminates the game for all players; if the first symbol is not a termination symbol the game continues, the server starts a cash out decision timer and displays it on all player devices and then displays a cash out offer on the each client device of players who placed general pass line bets, where said cash it offer is the amount of the player's bet multiplied times the corresponding cash out multiple from the pass line payout table; for the each client device that accepts the cash out offer before the second timer, the server credits their accounts in the amount of the cash out offer conveyed to them; all don't pass bets that were predicated on the first symbol being a termination symbol lose and the server ends the game for those players; if the first symbol drawn is a symbol that constitutes a specific winning non-termination symbol from the combo line, then bets on that specific non-termination symbol win and the server credits the account of each winning bettor the amount of their bet multiplied times the corresponding payout multiple from the combo line payout table; before the round concludes, the server updates the bet confirmation window of each winning and losing player on that player's client device and updates the player table on all client devices and the round of play is concluded;

wherein the server then initiates a second round of play, randomly draws the second symbol from the set of symbols and displays the second symbol on a display of each client device; If the second symbol is a termination symbol, then all remaining pass line bets and combo bets lose and all remaining don't pass line bets win and the server credits the account of each winning bettor the amount of their bet multiplied times the corresponding payout multiple from the don't pass payout table associated with their bet and then terminates the game for all players; if the second symbol is not a termination symbol the game continues, the server starts a cash out decision timer and displays the cash out decision timer and a cash out offer on the each client device of players remaining who placed general pass line bets, where said cash offer is the amount of the player's bet multiplied times the corresponding cash out multiple from the pass line payout table; for the each client device that accepts the cash out offer before the cash out decision timer ends, the server credits their accounts in the amount of the cash out offer conveyed to them; all don't pass bets that were predicated on the second symbol being a termination symbol lose and the server ends the game for those players; if the first two symbols drawn constitute a specific winning non-termination symbol or combination from the combo line, then bets on that specific non-termination symbol win and the server credits the account of each winning bettor the amount of their bet multiplied times the corresponding payout multiple from the combo line payout table; before the round concludes, the server updates the bet confirmation window of each winning and losing player on that player's client device and updates the player table on all client devices and the round of play is concluded; and wherein additional rounds of play are initiated until a termination symbol appears, all remaining players have cashed out, a pre-established cumulative total of drawn symbols has been reached or all non-termination symbols in the defined set of symbols have been revealed and removed from the set of symbols and the game ends.

2. The gaming system of claim 1 where the non-termination symbols include a sub-set of playing cards from a standard deck of playing cards and the playing cards from a one or more standard 52-card decks of playing cards.

3. The gaming system of claim 1 where the symbols are numbers and are included in lottery balls.

4. The gaming system of claim 1 where the symbols include dice, slots in a spinning wheel, reels of a slot machine, playing chips, stones, and non-standard playing cards.

5. A gaming system comprising:

a server;

a plurality of player devices connected to the server each associated with a player, the player devices displaying a graphic representation of a physical gaming table that contains marked locations for the placement of drawn symbols as they are randomly drawn and revealed by the server, a game message window, a bet confirmation window, and a player table;

also accessible through the client devices are a pass line payout table, a do not pass line payout table, a combo line payout table;

a set of x symbols that includes the cards from a standard deck of 52 playing cards and z termination cards that are non-standard playing cards where the symbols are graphically represented once drawn and displayed on player client devices;

and wherein the server starts an initial time period and requests a wager concurrently from each client device;

thereafter, the server displays player betting type controls on the player client devices that enable a player to select the type of bet they wish to place, including manual pass line bets, which are bets that provide the bettor with the option to cash out their bet after each subsequent non-termination symbol is drawn before a termination symbol is drawn; auto cash out pass line bets, which are bets based on the number of non-termination symbols being drawn before a termination symbol is drawn; specific don't pass line bets, which are bets based on the specific number of symbols by when a termination symbol is drawn where a winning bet occurs if a termination symbol is drawn by the number predicted; and combination line bets, which are bets based on the drawing of a specific single non-termination symbol or combination of non-termination symbols before a termination symbol is drawn; the server also displays a bet amount entry field and a place bet button on the client devices;

wherein after the initial time period ends, for the each player client device that placed a wager within the initial time period, the server collects the wager, debits the account of the player, updates the bet confirmation window of the each client device with the parameters of the bet and updates the player table on the each client device by including the usernames of the players playing and their respective wager amount;

such that the server then initiates the first round of play, randomly draws the first playing card from the set of playing cards and then displays the first playing card on a display of each client device; If the first playing card is a termination card, then all pass line bets and combo bets lose and all don't pass line bets win and the server credits the account of each winning bettor the amount of their bet multiplied times the corresponding payout multiple from the don't pass payout table associated with their bet and then terminates the game for all players; if the first playing card is not a termination card the game continues, the server starts a cash out decision timer and displays it on all player devices and then displays a cash out offer on the each client device of players who placed general pass line bets, where said cash it offer is the amount of the player's bet multiplied times the corresponding cash out multiple from the pass line payout table; for the each client device that accepts the cash out offer before the second timer, the server credits their accounts in the amount of the cash out offer conveyed to them; all don't pass bets that were predicated on the first symbol being a termination symbol lose and the server ends the game for those players; if the first playing card drawn is a playing card that constitutes a specific winning non-termination playing card from the combo line, then bets on that specific non-termination playing card win and the server credits the account of each winning bettor the amount of their bet multiplied times the corresponding payout multiple from the combo line payout table; before the round concludes, the server updates the bet confirmation window of each winning and losing player on that player's client device and updates the player table on all client devices and the round of play is concluded;

wherein the server then initiates a second round of play, randomly draws the second playing card from the set of playing cards and displays the second playing card on a display of each client device; If the second playing card is a termination card, then all remaining pass line bets and combo bets lose and all remaining don't pass line bets win and the server credits the account of each winning bettor the amount of their bet multiplied times the corresponding payout multiple from the don't pass payout table associated with their bet and then terminates the game for all players; if the second playing card is not a termination card the game continues, the server starts a cash out decision timer and displays the cash out decision timer and a cash out offer on the each client device of players remaining who placed general pass line bets, where said cash offer is the amount of the player's bet multiplied times the corresponding cash out multiple from the pass line payout table; for the each client device that accepts the cash out offer before the cash out decision timer ends, the server credits their accounts in the amount of the cash out offer conveyed to them; all don't pass bets that were predicated on the second playing card being a termination symbol lose and the server ends the game for those players; if the first two playing cards drawn constitute a specific winning non-termination playing card or combination from the combo line, then bets on that specific non-termination playing card win and the server credits the account of each winning bettor the amount of their bet multiplied times the corresponding payout multiple from the combo line payout table; before the round concludes, the server updates the bet confirmation window of each winning and losing player on that player's client device and updates the player table on all client devices and the round of play is concluded; and and wherein additional rounds of play are initiated until a termination symbol appears, all remaining players have cashed out, a pre-established cumulative total of drawn symbols has been reached or all non-termination symbols in the defined set of symbols have been revealed and removed from the set of symbols and the game ends.

6. The gaming system of claim 5 where the non-termination cards do not include all 52 playing cards from a standard deck of playing cards, the playing cards from a single standard 52-card deck of playing cards or the playing cards from multiple standard 52-card decks of playing cards.

7. The gaming system of claim 5 where the termination cards are Joker cards.

8. The gaming system of claim 5 where the total number of termination cards is one, two, three, four, five or six.

9. A gaming system comprising:

a set of x symbols that includes y non-termination symbols and z termination symbols where the symbols are represented through a physical medium;

a live dealer;

a physical gaming table that contains marked locations for the placement of drawn symbols as they are randomly drawn and by the dealer, marked locations for players to place general pass line bets, which are bets that provide the bettor with the option to cash out their bet after each non-termination symbol is drawn based on the total number of non-terminations symbols drawn before a termination symbol is drawn; specific pass line bets, which are bets placed in advance of the initial draw that win a specific total number of non-termination symbols drawn before a termination symbol is drawn where a winning bet occurs if at least the predicted number of non-termination symbols is drawn before a termination symbol is drawn; specific don't pass line bets, which are bets based on the specific number of symbols by when a termination symbol is drawn where a winning bet occurs if a termination symbol is drawn by the number predicted; and combination line bets, which are bets based on the drawing of a specific single non-termination symbol or combination of non-termination symbols before a termination symbol is drawn;

payout tables with payout multiples that list the payouts for successful pass line bets, do not pass line bets, and combination line bets;

the dealer first requests that bets be placed on the gaming table by the players and the players then place bets on the gaming table by either placing cash or a cash equivalent (poker or casino chips) on the table in the associated marked locations of their desired wagers;

the dealer then randomly draws a first symbol from the set of symbols, reveals it and displays it in the relevant marked location on the gaming table; if the first symbol is a termination symbol, then all pass line bets and combo bets lose and the dealer confiscates all bettor cash or equivalent placed in locations on the table associated with those bets; all don't pass line bets win and the dealer pays each bettor the amount of their bet multiplied times the corresponding payout multiple from the don't pass payout table associated with their bet and the game ends; if the first symbol is not a termination symbol the game continues and the dealer conveys to all players who placed general pass line bets a cash out offer, which is the amount of the player's bet multiplied times the corresponding cash out multiple from the pass line payout table; the dealer then pays each player who accepted the cash out offer the amount of the cash out offer conveyed to them; all don't pass bets that were predicated on the first symbol being a termination symbol lose and the dealer confiscates all bettor cash or equivalent placed on the table for those bets; if the first symbol drawn is a symbol that constitutes a specific winning non-termination symbol from the combo line, then bets on that specific non-termination symbol win and the dealer pays each bettor who placed a bet on the specific winning non-termination symbol the amount of their bet multiplied times the corresponding payout multiple from the combo line payout table and the game continues;

wherein the dealer then randomly draws a second symbol from the set of symbols and displays it in the relevant marked location on the gaming table; if the second symbol is a termination symbol, then all remaining pass line bets and combo bets lose and the dealer confiscates all bettor cash or equivalent placed in locations on the table associated with those bets; all remaining don't pass line bets win and the dealer pays each bettor the amount of their bet multiplied times the corresponding payout multiple from the don't pass payout table associated with their bet and the game ends; if the second symbol is not a termination symbol the game continues and the dealer conveys to all remaining players who placed general pass line bets a cash out offer, which is the amount of the player's bet multiplied times the corresponding cash out multiple from the pass line payout table; the dealer then pays each player who accepted the cash out offer the amount of the cash out offer conveyed to them; all don't pass bets that were predicated on a termination symbol being drawn by a second drawn symbol lose and the dealer confiscates all bettor cash or equivalent placed on the table for those bets; if the drawn symbols constitutes a specific winning symbol or combination of symbols from the combo line, then bets on that specific symbol or combination of symbols win and the dealer pays each bettor who placed a bet on the specific winning symbol or combination of symbols the amount of their bet multiplied times the corresponding payout multiple from the combo line payout table and the game continues; and thereafter additional symbols are randomly drawn by the dealer and displayed on the table until a termination symbol is drawn, all remaining players have either accepted pass line cash out offers, a pre-established cumulative total number of drawn symbols has been drawn or all non-termination symbols in the defined set of symbols have been drawn and removed from the set of symbols.

10. The gaming system of claim 9 where the non-termination symbols are a sub-set of playing cards from a standard deck of playing cards, the playing cards from a one or more standard 52-card decks of playing cards and the physical representation of the symbols are in the form of physical playing cards.

11. The gaming system of claim 9 where the symbols are numbers and the physical representation of the symbols are lottery balls.

12. The gaming system of claim 9 where the physical representation of the symbols include dice, slots in a spinning wheel, reels of a slot machine, playing chips, stones, and non-standard playing cards.

* * * * *